United States Patent
Madhavan et al.

(10) Patent No.: US 9,940,606 B2
(45) Date of Patent: Apr. 10, 2018

(54) CORRELATING JOBS WITH PERSONALIZED LEARNING ACTIVITIES IN ONLINE EDUCATION PLATFORMS

(71) Applicant: Chegg, Inc., Santa Clara, CA (US)

(72) Inventors: Anand Madhavan, Santa Clara, CA (US); Paul Chris Sri, San Jose, CA (US); Benjamin James Bercovitz, Mountain View, CA (US); Vincent Le Chevalier, San Jose, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 993 days.

(21) Appl. No.: 14/067,725

(22) Filed: Oct. 30, 2013

(65) Prior Publication Data
US 2015/0120593 A1    Apr. 30, 2015

(51) Int. Cl.
| G06Q 10/00 | (2012.01) |
| G06Q 10/10 | (2012.01) |
| G09B 5/00 | (2006.01) |
| G06Q 50/20 | (2012.01) |
| G06Q 10/06 | (2012.01) |

(52) U.S. Cl.
CPC .  *G06Q 10/1053* (2013.01); *G06Q 10/063112* (2013.01); *G06Q 50/2057* (2013.01); *G09B 5/00* (2013.01)

(58) Field of Classification Search
CPC combination set(s) only.
See application file for complete search history.

(56) References Cited

U.S. PATENT DOCUMENTS

| 5,873,730 | A | 2/1999 | Strong |
| 5,879,165 | A | 3/1999 | Brunkow et al. |
| 6,126,448 | A * | 10/2000 | Ho ............ G09B 7/04 434/118 |
| 6,944,596 | B1 | 9/2005 | Gray et al. |
| 6,978,115 | B2 * | 12/2005 | Whitehurst ....... G09B 7/04 118/118 |
| 6,996,366 | B2 | 2/2006 | L'Allier et al. |
| 2004/0219493 | A1 | 11/2004 | Phillips |
| 2005/0170321 | A1 | 8/2005 | Scully |
| 2006/0229902 | A1 * | 10/2006 | McGovern ...... G06Q 10/06 705/321 |

(Continued)

OTHER PUBLICATIONS

9. Wilson, Dan (BFO, "PDF Text Extraction in Java", Nov. 16, 2011).*
U.S. Appl. No. 13/971,738, filed Aug. 20, 2013, 44 Pages, (Not Yet Published).

(Continued)

*Primary Examiner* — Gabrielle A McCormick
(74) *Attorney, Agent, or Firm* — Fenwick & West LLP

(57) ABSTRACT

Employers or recruiters populate an online database with job postings. The concepts that job applicants need to have learned to be successful applicants for a job are stated or inferred from the job posting and optionally resumes of others who have held that job. A student's own learning activities are logged by an online education platform. From a comparison between the student's completed learning units and a job posting's required learning units, a personalized learning unit gap can be identified for a student. The online education platform can then recommend how the student can fill the gap by undertaking the study of learning units on the education platform.

20 Claims, 17 Drawing Sheets

(56) References Cited

U.S. PATENT DOCUMENTS

| | | |
|---|---|---|
| 2007/0224580 A1 | 9/2007 | McFaul |
| 2008/0102427 A1* | 5/2008 | Nissle .................... G09B 19/00 434/322 |
| 2008/0227063 A1 | 9/2008 | Kenedy et al. |
| 2008/0288431 A1* | 11/2008 | Colson .................... G06N 5/02 706/47 |
| 2009/0123902 A1* | 5/2009 | Higgs .................... G09B 19/00 434/323 |
| 2009/0144158 A1* | 6/2009 | Matzelle ........... G06F 17/30899 705/14.56 |
| 2009/0228323 A1 | 9/2009 | Ebrahimian |
| 2010/0004944 A1 | 1/2010 | Palaniappan |
| 2010/0179916 A1 | 7/2010 | Johns et al. |
| 2011/0188761 A1* | 8/2011 | Boutros .................. G06K 9/68 382/218 |
| 2012/0028230 A1 | 2/2012 | Devereux |
| 2013/0096892 A1* | 4/2013 | Essa ........................ G09B 7/00 703/2 |
| 2013/0164720 A1 | 6/2013 | Siimes et al. |
| 2014/0067703 A1* | 3/2014 | Baeck ................ G06Q 10/1053 705/321 |
| 2014/0074740 A1 | 3/2014 | Philips et al. |
| 2014/0186817 A1 | 7/2014 | Wang et al. |

OTHER PUBLICATIONS

U.S. Appl. No. 13/540,432, filed Jul. 2, 2012, 66 Pages, (Not Yet Published).
U.S. Appl. No. 13/540,432, filed Jul. 2, 2012, 66 Pages, Not yet published.

\* cited by examiner

Supply Chain Coordinator

Supply Chain | Santa Clara, CA, United States

Chegg is disrupting education by transforming the way millions of students learn. We started as a textbook rental company and through adding new services like Chegg study, course selection, eTextbooks options and scholarship matching, we now have a student hub that makes learning easier, more accessible and more productive.

We are currently seeking a Supply Chain Coordinator for the Supply Chain team. This is a position with tactical responsibilities managing day-to-day procurement and purchase order/software processing tasks. A significant portion of the role will involve interaction with vendors-answering questions, resolving issues and probing for feedback.

This is a full-time, 2-5 month contract role located at our Santa Clara HQ.

Job Responsibilities:

- Work with a cross-functional group to manage supply chain activities
- Create and execute purchase orders
- Email and phone correspondence with vendors/suppliers
- Reconcile vendor shipments against purchase orders with the help of warehouse
- Data Analysis Desired skills and experience:

Education
- Bachelor's degrees in technical or analytical field (i.e. engineering, CS, math, economics, business)

Technical skills
- Power Microsoft Excel user
- Knowledge of MySQL a plus

Other
- Excellent verbal and written communications skills
- Outstanding customer service skills, and previous account management or customer service experience
- Excellent organizational skills
- Team player, reliable, strong work ethic
- Able to work in fast-paced environment
- Experience working across groups, teams and/or functions

FIG. 11A

UX Designer

Design | Santa Clara, CA, United States

Chegg is always looking to network with amazing designers. We currently are not hiring for this role but are continuously thinking about the shape of our design organization as our company evolves and grows. Our Head of Design enjoys connecting with strong design athletes now, and then packing up the conversation when a role opens up. If you are interested in starting a dialog with Chegg for a future design role, take a look at the profile below and send us your info.

What makes for a good fit at Chegg

You are comfortable working at a "big startup" that seeks to maintain a fast, fluid and flexible approach, but you also understand the importance of focus and discipline. From time to time, you will navigate both the change and ambiguity that is a natural by-product of a company this size.

- You are confident.
- You want to be part of a team that is disrupting and transforming an industry.
- You can collaborate as easily as you breathe.
- You love the challenge of quickly distilling complex problems into clean, simple design solutions.
- You can debate and disagree without being disagreeable — no divas!
- You are results oriented. You can both think and do.

What makes for a good fit for our Design team

Must Haves

- You have an online portfolio, preferably exhibiting strong experience with large, online brands
- You're adept at user centered design methodologies
- You are highly capable at iterative design and rapid prototyping (both low- and high-fidelity)
- You know your medium through and understanding of HTML, CSS and javascript. You're not a front-end developer, but you know how a website works.
- You have a strong ability to blend both quantitative metrics and qualitative feedback into the product design process.
- You have a degree in Human Computer Interaction, Industrial Design, Visual Arts, Graphic Design or related field or equivalent Nice to Haves

- Mobile and device experience
- Knowledge and expertise in designing social systems
- Experience integrating UX into an Agile development process
- Experience working in a data-driven environment focused on metrics and other objective measures.

| Probability | Ranked Jobs | Timeframe | Cost | Complexity | Compensation |
|---|---|---|---|---|---|
| Highest | Job #1 | Shortest | $ | Easy | $$$ |
| Average | Job #2 | Shortest | $ | Medium | $ |
| Average | Job #3 | Average | $$ | Medium | $$ |
| ⋮ | ⋮ | ⋮ | ⋮ | ⋮ | ⋮ |
| Lowest | Job #N | Longest | $$$ | Hard | $$ |

FIG. 14B

| Ranked Jobs | Timeframe | Compensation |
|---|---|---|
| Job X | Shortest | $$ |
| Job Y | Average | $$ |
| Job Z | Longest | $$$$ |

CORRELATING JOBS WITH PERSONALIZED LEARNING ACTIVITIES IN ONLINE EDUCATION PLATFORMS

BACKGROUND

Field of the Invention

This invention relates to automated processing of job postings on an online education platform.

Description of the Related Art

The rising demand for high-skilled resources in a global economy is putting growing pressure on traditional education systems and environments. As too many students find themselves unable to effectively compete on today's job market, the need for education platforms to produce better tailored learning solutions is compelled with rising tuition costs amid challenging economies.

The resulting skills gap between actual degrees and jobs remains challenging to address because education, contrary to other domains, has typically been slow to adapt to new digital technologies both in term of infrastructure, curriculum and publishing platforms. Typically, the structure of a course, with the required textbook as its central point of reference, has stayed remarkably monolithic and static over time, regardless of content or delivery formats, contributing to the current mismatch between the academic and professional workplace.

As traditional courses are shifting from a static textbook-centric model to a connected one where related, personalized and other social-based content activities are being aggregated dynamically within the core academic material, it becomes strategic for education publishing platforms and their distribution systems to be able to translate these activities into new models of learning that can bridge the growing gap between what business needs and what education delivers.

SUMMARY

Embodiments of the invention recommend learning activities for students who desire to apply for available jobs. Employers or recruiters populate an online database with job postings. The concepts that job applicants need to have learned to be successful applicants for a job are stated or inferred from the job posting and optionally resumes of others who have held that job. A student's own learning activities are logged by an online education platform. From a comparison between the student's completed learning units and a job posting's required learning units, a personalized learning unit gap can be identified for a student. The online education platform can then recommend how the student can fill the gap by undertaking the study of learning units on the education platform.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 11A-C illustrate example job postings from which learning units can be extracted in accordance with an embodiment.

FIG. 14A-B illustrate example job planning dashboards, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention will be described in the context of a versatile education social learning platform for digital content interactive services distribution and consumption. In the platform, personalized learning services are paired with secured distribution and analytics systems for reporting on both connected user activities and effectiveness of deployed services. By analyzing key activities that users are engaging in while accessing integrated learning services, the platform is able to deconstruct courses into individual concepts and pair these concepts to activities that users are likely to do. As a result, a model of learning is developed where courses are atomized into individual "learning units" that can be expressed independently or aggregated as desired. The concepts that job applicants need to have learned to be successful applicants for a job can be expressed as an aggregation of learning units. These learning units can be stated in or inferred from a job posting and optionally resumes of others who have held the described job. By comparing the job posting's required learning units to a student's completed learning units, a personalized learning unit gap can be identified. The online education platform can then recommend how the student can fill the gap through interactions with the education platform.

Figure 1:
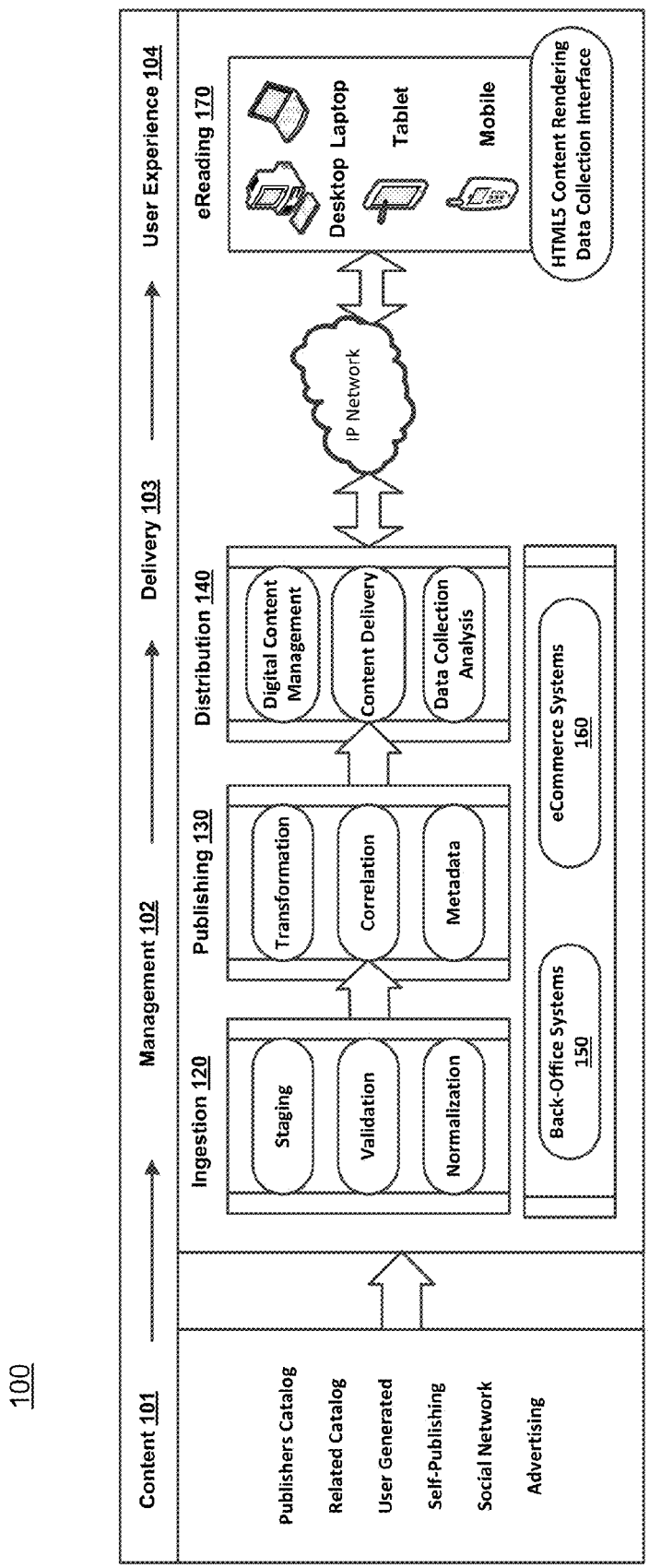
FIG. 1 illustrates an example publishing platform, according to one embodiment.

FIG. 1 is a high-level block diagram illustrating the education platform environment 100. The education platform environment 100 is organized around four function blocks: content 101, management 102, delivery 103, and experience 104.

Content block 101 automatically gathers and aggregates content from a large number of sources, categories, and partners. Whether the content is curated, perishable, on-line, or personal, these systems define the interfaces and processes to automatically collect various content sources into a formalized staging environment.

Management block 102 comprises five blocks with respective submodules: ingestion 120, publishing 130, distribution 140, back office system 150, and eCommerce system 160. The ingestion module 120, including staging, validation, and normalization subsystems, ingests published documents that may be in a variety of different formats, such as PDF, ePUB2, ePUB3, SVG, XML, or HTML. The ingested document may be a book, such as a textbook, a set of self-published notes, or any other published document, and may be subdivided in any manner. For example, the document may have a plurality of pages organized into chapters, which could be further divided into one or more sub-chapters. Each page may have text, images, tables, graphs, or other items distributed across the page.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

The page structure information is assembled into a document-specific table of contents describing locations of chapter headings and sub-chapter headings within the reconstructed document, as well as locations of content within each heading. During reconstruction, document metadata describing a product description, pricing, and terms (e.g., whether the content is for sale, rent, or subscription, or whether it is accessible for a certain time period or geographic region, etc.) are also added to the reconstructed document.

The reconstructed document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure. The process performed by the publishing system 130 to reconstruct a document and generate a table of contents is described further with respect to FIG. 3.

The distribution system 140 packages content for delivery, uploads the content to content distribution networks, and makes the content available to end users based on the content's digital rights management policies. In one embodiment, the distribution system 140 includes digital content management, content delivery, and data collection and analysis subsystems.

Whether the ingested document is in a markup language document or is reconstructed by the publishing system 130, the distribution system 140 may aggregate additional content layers from numerous sources into the ingested or reconstructed document. These layers, including related content, advertising content, social content, and user-generated content, may be added to the document to create a dynamic, multilayered document. For example, related content may comprise material supplementing the foundation document, such as study guides, self-testing material, solutions manuals, glossaries, or journal articles. Advertising content may be uploaded by advertisers or advertising agencies to the publishing platform, such that advertising content may be displayed with the document. Social content may be uploaded to the publishing platform by the user or by other nodes (e.g., classmates, teachers, authors, etc.) in the user's social graph. Examples of social content include interactions between users related to the document and content shared by members of the user's social graph. User-generated content includes annotations made by a user during an eReading session, such as highlighting or taking notes. In one embodiment, user-generated content may be self-published by a user and made available to other users as a related content layer associated with a document or as a standalone document.

As layers are added to the document, page information and metadata of the document are referenced by all layers to merge the multilayered document into a single reading experience. The publishing system 130 may also add information describing the supplemental layers to the reconstructed document's table of contents. Because the page-based document ingested into the management block 102 or the reconstructed document generated by the publishing system 130 is referenced by all associated content layers, the ingested or reconstructed document is referred to herein as a "foundation document," while the "multilayered document" refers to a foundation document and the additional content layers associated with the foundation document.

The back-office system 150 of management block 102 enables business processes such as human resources tasks, sales and marketing, customer and client interactions, and technical support. The eCommerce system 160 interfaces with back office system 150, publishing 130, and distribution 140 to integrate marketing, selling, servicing, and receiving payment for digital products and services.

Delivery block 103 of an educational digital publication and reading platform distributes content for user consumption by, for example, pushing content to edge servers on a content delivery network. Experience block 104 manages user interaction with the publishing platform through browser application 170 by updating content, reporting users' reading and other educational activities to be recorded by the platform, and assessing network performance.

In the example illustrated in FIG. 1, the content distribution and protection system is interfaced directly between the distribution sub-system 140 and the browser application 170, essentially integrating the digital content management (DCM), content delivery network (CDN), delivery modules, and eReading data collection interface for capturing and serving all users' content requests. By having content served dynamically and mostly on-demand, the content distribution and protection system effectively authorizes the download of one page of content at a time through time-sensitive dedicated URLs which only stay valid for a limited time, for example a few minutes in one embodiment, all under control of the platform service provider.

Platform Content Processing and Distribution

Figure 2:
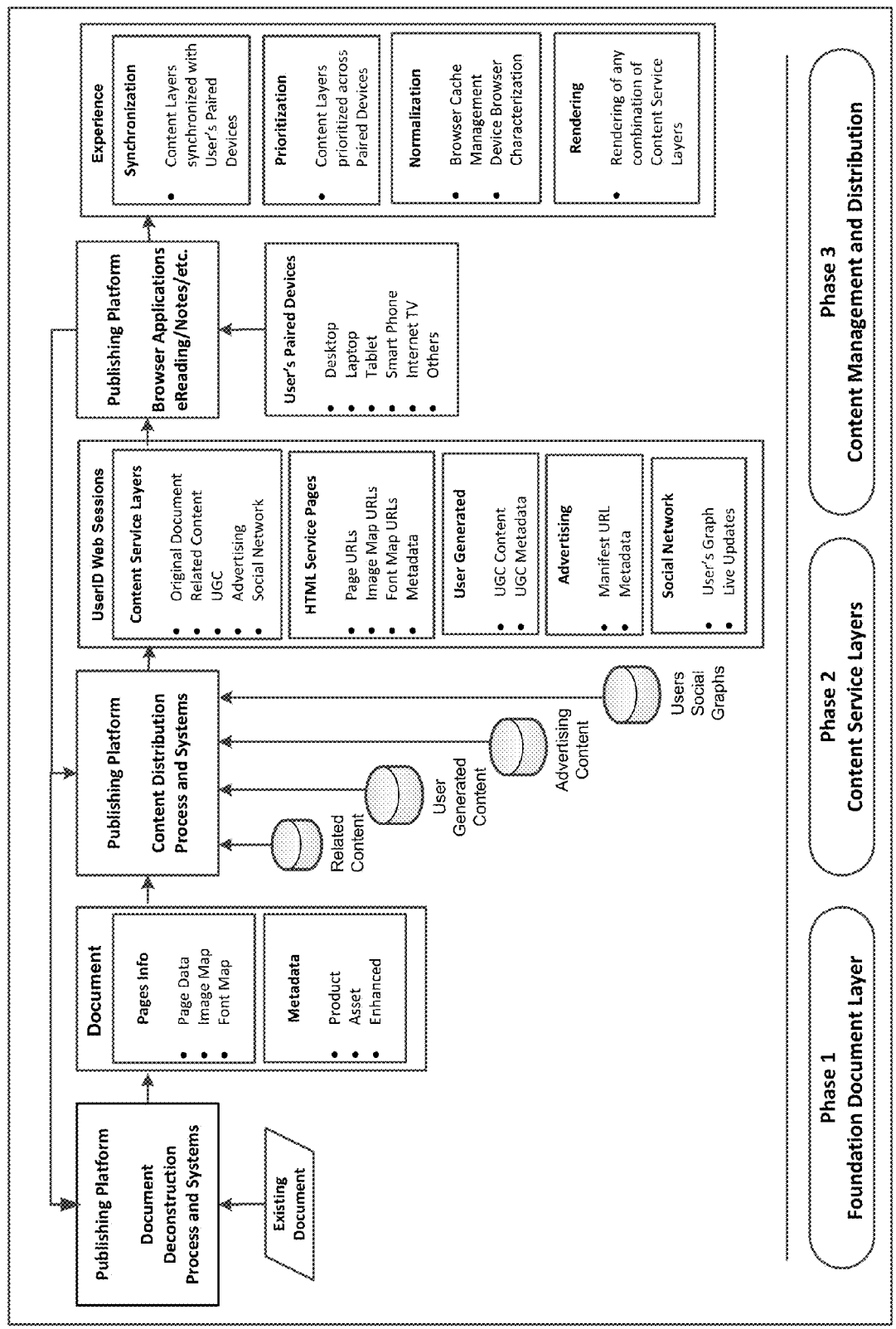
FIG. 2 is a block diagram illustrating interactions with a publishing platform, according to one embodiment.

The platform content catalog is a mosaic of multiple content sources which are collectively processed and assembled into the overall content service offering. The content catalog is based upon multilayered publications that are created from reconstructed foundation documents augmented by supplemental content material resulting from users' activities and platform back-end processes. FIG. 2 illustrates an example of a publishing platform where multilayered content document services are assembled and distributed to desktop, mobile, tablet, and other connected devices. As illustrated in FIG. 2, the process is typically segmented into three phases: Phase 1: creation of the foundation document layer; Phase 2: association of the content service layers to the foundation document layer; and Phase 3: management and distribution of the content.

During Phase 1, the licensed document is ingested into the publishing platform and automatically reconstructed into a series of basic elements, while maintaining page fidelity to the original document structure. Document Reconstruction will be described in more detail below with reference to FIG. 2.

During Phase 2, once a foundation document has been reconstructed and its various elements extracted, the publishing platform runs several processes to enhance the reconstructed document and transform it into a personalized multilayered content experience. For instance, several distinct processes are run to identify the related content to the reconstructed document, user generated content created by registered users accessing the reconstructed document, advertising or merchandising material that can be identified by the platform and indexed within the foundation document and its layers, and finally social network content resulting from registered users' activities. By having each of these processes focusing on specific classes of content and databases, the elements referenced within each classes become identified by their respective content layer. Specifically, all the related content page-based elements that are matched with a particular reconstructed document are classified as part of the related content layer. Similarly, all other document enhancement processes, including user generated, advertising and social among others, are classified by their specific content layer. The outcome of Phase 2 is a series of static and dynamic page-based content layers that are logically stacked on top of each other and which collectively enhance the reconstructed foundation document.

During Phase 3, once the various content layers have been identified and processed, the resulting multilayered content are then published to the platform content catalog and pushed to the content servers and distribution network for distribution. By having multilayered content services served dynamically and on-demand through secured authenticated web sessions, the content distribution systems are effectively authorizing and directing the real-time download of page-based layered content services to a user's paired devices. These devices access the services through time sensitive dedicated URLs which, in one embodiment, only stay valid for a few minutes, all under control of the platform service provider. The browser-based applications are embedded, for example, into HTML5 compliant web browsers which control the fetching, requesting, synchronization, prioritization, normalization and rendering of all available content services.

Document Reconstruction

The publishing system 130 receives original documents for reconstruction from the ingestion system 120 illustrated in FIG. 1. In one embodiment, a series of modules of the publishing system 130 are configured to perform the document reconstruction process.

Figure 3:
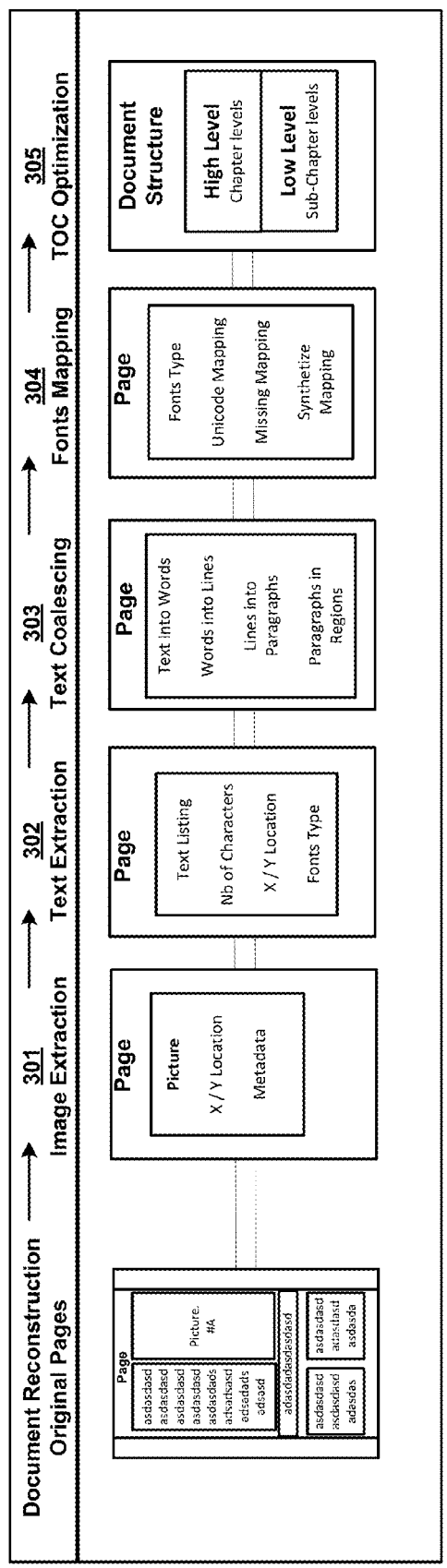
FIG. 3 illustrates a document reconstruction process, according to one embodiment.

FIG. 3 illustrates a process within the publishing system 130 for reconstructing a document. Embodiments are described herein with reference to an original document in the Portable Document Format (PDF) that is ingested into the publishing system 130. However, the format of the original document is not limited to PDF; other unstructured document formats can also be reconstructed into a markup language format by a similar process.

A PDF page contains one or more content streams, which include a sequence of objects, such as path objects, text objects, and external objects. A path object describes vector graphics made up of lines, rectangles, and curves. Path can be stroked or filled with colors and patterns as specified by the operators at the end of the path object. A text object comprises character stings identifying sequences of glyphs to be drawn on the page. The text object also specifies the encodings and fonts for the character strings. An external object XObject defines an outside resource, such as a raster image in JPEG format. An XObject of an image contains image properties and an associated stream of the image data.

During image extraction 301, graphical objects within a page are identified and their respective regions and bounding boxes are determined. For example, a path object in a PDF page may include multiple path construction operators that describe vector graphics made up of lines, rectangles, and curves. Metadata associated with each of the images in the document page is extracted, such as resolutions, positions, and captions of the images. Resolution of an image is often measured by horizontal and vertical pixel counts in the image; higher resolution means more image details. The image extraction process may extract the image in the original resolution as well as other resolutions targeting different eReading devices and applications. For example, a large XVGA image can be extracted and down sampled to QVGA size for a device with QVGA display. The position information of each image may also be determined. The position information of the images can be used to provide page fidelity when rendering the document pages in eReading browser applications, especially for complex documents containing multiple images per page. A caption associated with each image that defines the content of the image may also be extracted by searching for key words, such as "Picture", "Image", and "Tables", from text around the image in the original page. The extracted image metadata for the page may be stored to the overall document metadata and indexed by the page number.

Image extraction 301 may also extract tables, comprising graphics (horizontal and vertical lines), text rows, and/or text columns. The lines forming the tables can be extracted and stored separately from the rows and columns of the text.

The image extraction process may be repeated for all the pages in the ingested document until all images in each page are identified and extracted. At the end of the process, an image map that includes all graphics, images, tables and other graphic elements of the document is generated for the eReading platform.

During text extraction 302, text and embedded fonts are extracted from the original document and the location of the text elements on each page are identified.

Text is extracted from the pages of the original document tagged as having text. The text extraction may be done at the individual character level, together with markers separating words, lines, and paragraphs. The extracted text characters and glyphs are represented by the Unicode character mapping determined for each. The position of each character is identified by its horizontal and vertical locations within a page. For example, if an original page is in A4 standard size, the location of a character on the page can be defined by its X and Y location relative to the A4 page dimensions. In one embodiment, text extraction is performed on a page-by-page basis. Embedded fonts may also be extracted from the original document, which are stored and referenced by client devices for rendering the text content.

The pages in the original document having text are tagged as having text. In one embodiment, all the pages with one or more text objects in the original document are tagged. Alternatively, only the pages without any embedded text are marked.

The output of text extraction 302, therefore, a dataset referenced by the page number, comprising the characters and glyphs in a Unicode character mapping with associated location information and embedded fonts used in the original document.

Text coalescing 303 coalesces the text characters previously extracted. In one embodiment, the extracted text characters are coalesced into words, words into lines, lines into paragraphs, and paragraphs into bounding boxes and regions. These steps leverage the known attributes about extracted text in each page, such as information on the text position within the page, text direction (e.g., left to right, or top to bottom), font type (e.g., Arial or Courier), font style (e.g., bold or italic), expected spacing between characters based on font type and style, and other graphics state parameters of the pages.

In one embodiment, text coalescence into words is performed based on spacing. The spacing between adjacent characters is analyzed and compared to the expected character spacing based on the known text direction, font type, style, and size, as well as other graphics state parameters, such as character-spacing and zoom level. Despite different rendering engines adopted by the browser applications 170, the average spacing between adjacent characters within a word is smaller than the spacing between adjacent words. For example, a string of "Berriesaregood" represents extracted characters without considering spacing information. Once taking the spacing into consideration, the same string becomes "Berries are good," in which the average character spacing within a word is smaller than the spacing between words.

Additionally or alternatively, extracted text characters may be assembled into words based on semantics. For example, the string of "Berriesaregood" may be input to a semantic analysis tool, which matches the string to dictionary entries or Internet search terms, and outputs the longest match found within the string. The outcome of this process is a semantically meaningful string of "Berries are good." In one embodiment, the same text is analyzed by both spacing and semantics, so that word grouping results may be verified and enhanced.

Words may be assembled into lines by determining an end point of each line of text. Based on the text direction, the horizontal spacing between words may be computed and averaged. The end point may have word spacing larger than the average spacing between words. For example, in a two-column page, the end of the line of the first column may be identified based on it having a spacing value much larger than the average word spacing within the column. On a single column page, the end of the line may be identified by the space after a word extending to the side of the page or bounding box.

After determining the end point of each line, lines may be assembled into paragraphs. Based on the text direction, the average vertical spacing between consecutive lines can be computed. The end of the paragraph may have a vertical spacing that is larger than the average. Additionally or alternatively, semantic analysis may be applied to relate syntactic structures of phrases and sentences, so that meaningful paragraphs can be formed.

The identified paragraphs may be assembled into bounding boxes or regions. In one embodiment, the paragraphs may be analyzed based on lexical rules associated with the corresponding language of the text. A semantic analyzer may be executed to identify punctuation at the beginning or end of a paragraph. For example, a paragraph may be expected to end with a period. If the end of a paragraph does not have a period, the paragraph may continue either on a next column or a next page. The syntactic structures of the paragraphs may be analyzed to determine the text flow from one paragraph to the next, and may combine two or more paragraphs based on the syntactic structure. If multiple combinations of the paragraphs are possible, reference may be made to an external lexical database, such as WORDNET®, to determine which paragraphs are semantically similar.

In fonts mapping 304, in one embodiment, a Unicode character mapping for each glyph in a document to be reconstructed is determined. The mapping ensures that no two glyphs are mapped to a same Unicode character. To achieve this goal, a set of rules is defined and followed, including applying the Unicode mapping found in the embedded font file; determining the Unicode mapping by looking up postscript character names in a standard table, such as a system TrueType font dictionary; and determining the Unicode mapping by looking for patterns, such as hex codes, postscript name variants, and ligature notations.

For those glyphs or symbols that cannot be mapped by following the above rules, pattern recognition techniques may be applied on the rendered font to identify Unicode characters. If pattern recognition is still unsuccessful, the unrecognized characters may be mapped into the private use area (PUA) of Unicode. In this case, the semantics of the characters are not identified, but the encoding uniqueness is guaranteed. As such, rendering ensures fidelity to the original document.

In table of contents optimization 305, content of the reconstructed document is indexed. In one embodiment, the indexed content is aggregated into a document-specific table of contents that describes the structure of the document at the page level. For example, when converting printed publications into electronic documents with preservation of page fidelity, it may be desirable to keep the digital page numbering consistent with the numbering of the original document pages.

The table of contents may be optimized at different levels of the table. At the primary level, the chapter headings within the original document, such as headings for a preface, chapter numbers, chapter titles, an appendix, and a glossary may be indexed. A chapter heading may be found based on the spacing between chapters. Alternatively, a chapter heading may be found based on the font face, including font type, style, weight, or size. For example, the headings may have a font face that is different from the font face used throughout the rest of the document. After identifying the headings, the number of the page on which each heading is located is retrieved.

At a secondary level, sub-chapter headings within the original document may be identified, such as dedications and acknowledgments, section titles, image captions, and table titles. Vertical spacing between sections, text, and/or font face may be used to segment each chapter. For example, each chapter may be parsed to identify all occurrences of the sub-chapter heading font face, and determine the page number associated with each identified sub-chapter heading.

Educational Course Deconstruction

Figure 4:
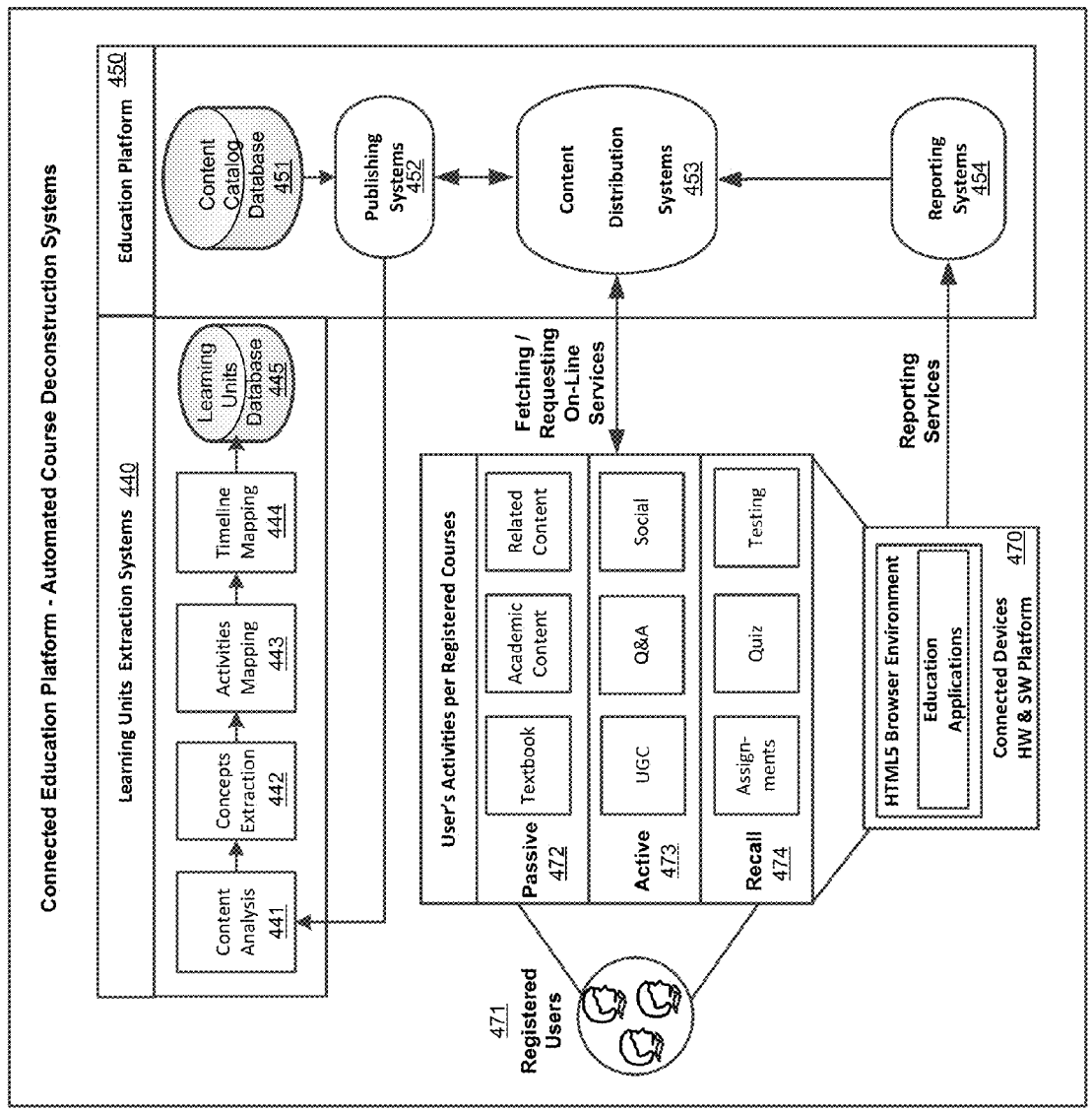
FIG. 4 illustrates an automated course deconstruction system, according to one embodiment.

FIG. 4 illustrates an automated educational course deconstruction system, according to one embodiment. FIG. 4 demonstrates the interaction between learning units extraction systems 440, the education platform 450, and the HTML5 browser environment 470. In some embodiments, the learning units extraction systems 440 may be integrated as part of the platform environment 100 illustrated in FIG. 1, and in other embodiments they may be separate systems. Likewise, the education platform 450 may have components in common with the functional blocks of the platform environment 100, and the HTML5 browser environment 470 may be the same as the eReading application 170 of the experience block 104 of the platform environment 100, or the functionality may be implemented in different modules.

The education platform 450 serves the education services to registered users 471 based on a process of requesting and fetching on-line services in the context of authenticated on-line sessions. In the example illustrated in FIG. 4, the education platform 450 includes a content catalog database 451, publishing systems 452, content distribution systems 453, and reporting systems 454. The content catalog database 451 contains the collection of content available via the education platform 451. The content catalog database 451 feeds the content to the publishing systems 452. The publishing systems 452 serve the content to registered users 471 via the content distribution system 453. Reporting systems 454 receive reports of user experience and user activities from the connected devices 470 operated by the registered users 471. This feedback is used by content distribution system 453 for managing the distribution of the content and for capturing UGC and other forms of user activities to add to the content catalog database 451.

The learning units extraction systems 440 receives published content from the publishing systems 452 for analysis, and provides a mapping of concepts to activities for storage in the learning units database 445. The learning units extraction system 440 include modules for content analysis 441, concepts extraction 442, and activities mapping 443, timeline mapping, and includes a learning units database 445.

The content analysis module 441 analyzes the content available from the content catalog database 451. This includes content added by registered users 471 through their interactions with the education platform 450. The content analysis module 441 collects and prepares related content for further processing by the learning units extraction systems 440.

The concepts extraction module 442 extracts concepts from the analyzed content to determine a list of concepts. The extracted list of concepts is stored in the learning units database 445.

The activities mapping module 443 determines which activities undertaken by the registered users 471 are related to which concepts. The activities mapping module 443 stores the association in the learning units database 445. Because the content and other services are originating from the same platform environment 100, the users' activities are analyzed and correlated to each other. These activities can be aggregated over time into distinct categories. These activities are broadly categorized as passive 472, active 473, and recall 474. Each concept is mapped to at least one type of user activity, and may be mapped to all three types of user activities.

Passive activities 472 includes activities where registered users are passively interacting with published academic content materials associated to a particular course. For example, the reference materials for a course typically include one or more published documents, such as textbook, summary, syllabus, and other digital related content which are aggregated at the course level and accessible from the registered users' connected devices. These activities are defined as "passive" because they are typically orchestrated by each user around multiple on-line reading authenticated sessions when accessing the structured HTML course-based referenced documents. By directly handling the fetching and requesting of all HTML course-based document pages for its registered users, the connected education platform analyzes the passive reading activities within each course, correlating how registered users are interacting with the referenced academic content within any course delivery.

Activities are defined as "active" when registered users are interacting with course-defined referenced academic documents by creating their own user generated content (UGC) layer as managed by the platform services. By contrast to "passive" activities, where content is predetermined, static and structured as part of a course description, the process of creating user generated content is unique to each user, both in terms of actual material, format, frequency or structure, for example. In this instance, UGC is defined by the creation of personal notes, highlights, asking or answering questions, and other comments, or interacting with other registered users 471 through the education platform 450 while accessing the referenced course-based HTML documents. Other types of UGC include seeking support when help is needed, running step-by-step problems associated to particular sections of course-based HTML documents, connecting and exchanging feedback with peers, among others. These UGC activities are authenticated through on-line "active" sessions that are processed and correlated by the platform content distribution system 453 and reporting system 454. By directly handling the fetching and requesting of all UGC content for registered users, the platform 450 can correlate how registered users add their UGC layer within any course delivery.

Activities are defined as "recall" activities when registered users are being tested against the knowledge acquired from their previous passive and active sessions. By contrast to the previous passive and active sessions, recalls can be orchestrated around combined predetermined content material with user generated content. For instance, the assignments, quizzes and other testing materials associated to the particular course and its curriculum are typically predefined and offered to registered users as structured documents that are enhanced once personal content is added into them. Typically, a set of predetermined questions which are aggregated by the platform 450 into a digital testing material is described as a structured HTML document that is published either as a stand-alone document or as supplemental to a course-based document. By contrast, the individual answers to these questions are expressed as UGC in some testing-like activities. When registered users are answering questions as part of a testing exercise within a course delivery, the resulting authenticated on-line sessions are processed and correlated by the platform content distribution 453 and reporting systems 454. By directly handling the fetching and requesting of all testing content for registered users, the platform 450 can correlate how registered users interact with the testing documents within any course delivery.

The timeline mapping module 444 determines the starting point and/or end point of activities that are recorded. The timeline mapping module 444 stores the respective times associated with the activities in the learning units database 445.

Figure 5:
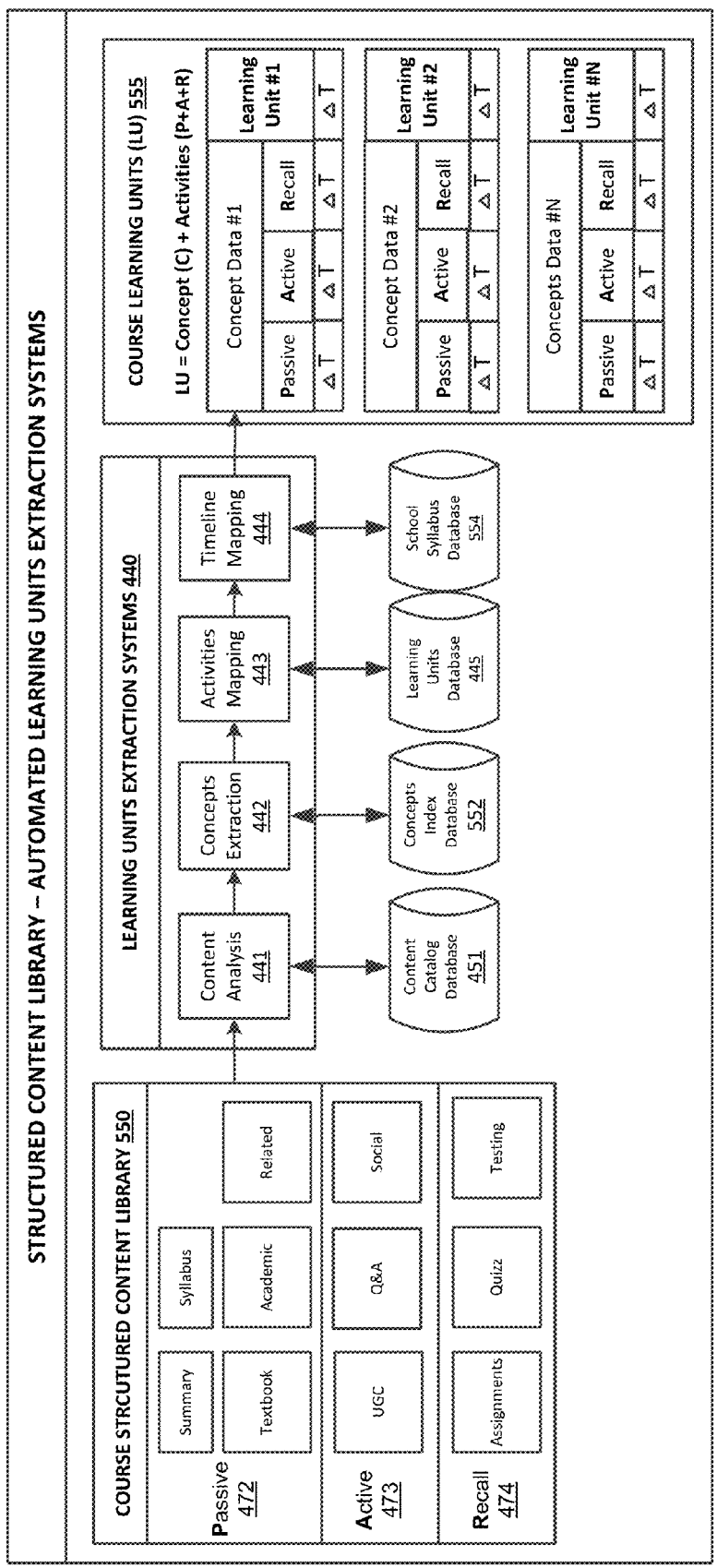
FIG. 5 illustrates the operation of automated learning units extraction systems, according to one embodiment.

FIG. 5 illustrates the operation of automated learning units extraction systems 440, according to one embodiment. The extraction of learning units drives the identification of activities in which users can be predicted to engage during the delivery of a course. Generally, the extraction is performed by atomizing the courses that users take into individual learning concepts. A general model of learning is then applied to these individual concepts in order to determine what likely activities that the users will be performing.

In the example of FIG. 5, the course structured content library 550 is made up of data that supports passive 472, active 473, and recall 474 activities that a registered user 471 may undertake as part of the user's study of at least one course. The course structured content library 550 may exist within the content catalog database 451. The content analysis module 441 analyzes the materials that make up and/or are generated by these passive 472, active 473, and recall 474 activities along with additional documents from the content catalog database 451, and indexes them for the concepts extraction module 442. The concepts extraction module 442 ranks the content affiliated per course of a plurality of courses and processes the content by extracting and normalizing the content into a unique combination of operands and operators that characterize the respective course. Each extracted combination of operand and operator forms a concept. As concepts are extracted by the concepts extraction module 442, they are indexed into the concepts index database 552. Then, the concepts are mapped to the activities that engage users who are studying those concepts as part of at least one course by the activities mapping module 443. The activities are also mapped to a timeline by start time, end time, and/or elapsed time of the activities that are undertaken by a timeline mapping module 444. The timeline mapping is informed by a school syllabus database 554 that contains information about course dates, lesson plans, or the like. The respective mappings of activities and timeline for each concept are stored in the learning units database 553.

As depicted in FIG. 5, course learning units 555 are output of the learning units extraction systems 440. Course learning units 555 are composed of the mapping between a concept and the activities that are performed by a user that are related to that concept within the time boundaries of an educational course. The coupling of one concept to at least one learning activity collectively defines a discrete learning unit. The learning unit attributes are expressed as the unique combination of a single concept with its mapped activities. A course is composed of a plurality of learning units, which may each be associated with a start time, an end time, a length of time, or an elapsed time in which the learning unit is studied and the activities associated with the learning unit are performed. Once a course has been deconstructed into a plurality of learning units, the learning units can be shuffled into different orders. Alternatively or additionally, once a plurality of courses have been deconstructed into discrete learning units, the learning units can be mixed, matched, or assembled into new courses.

Figure 6A:
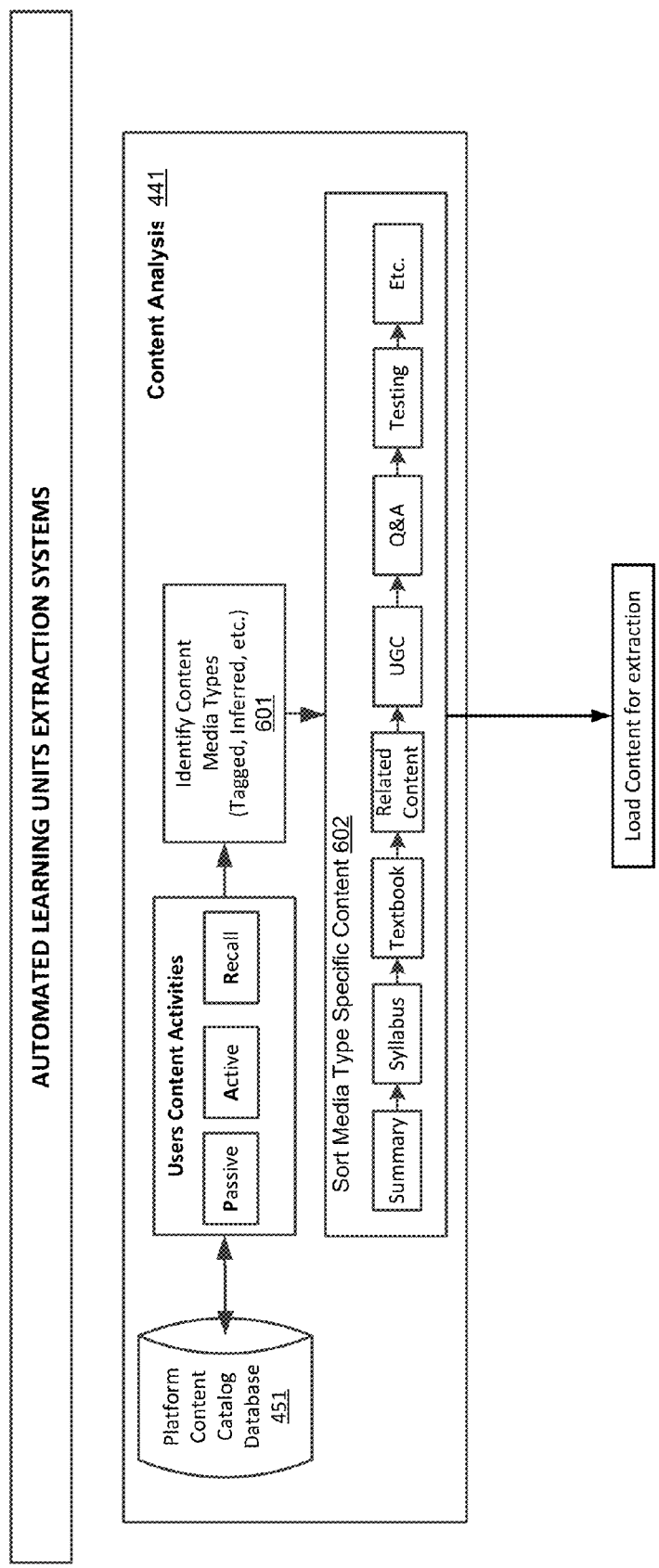
FIGS. 6A and 6B illustrate a process of learning unit extraction performed by automated learning units extraction systems, according to one embodiment.
Figure 6B:
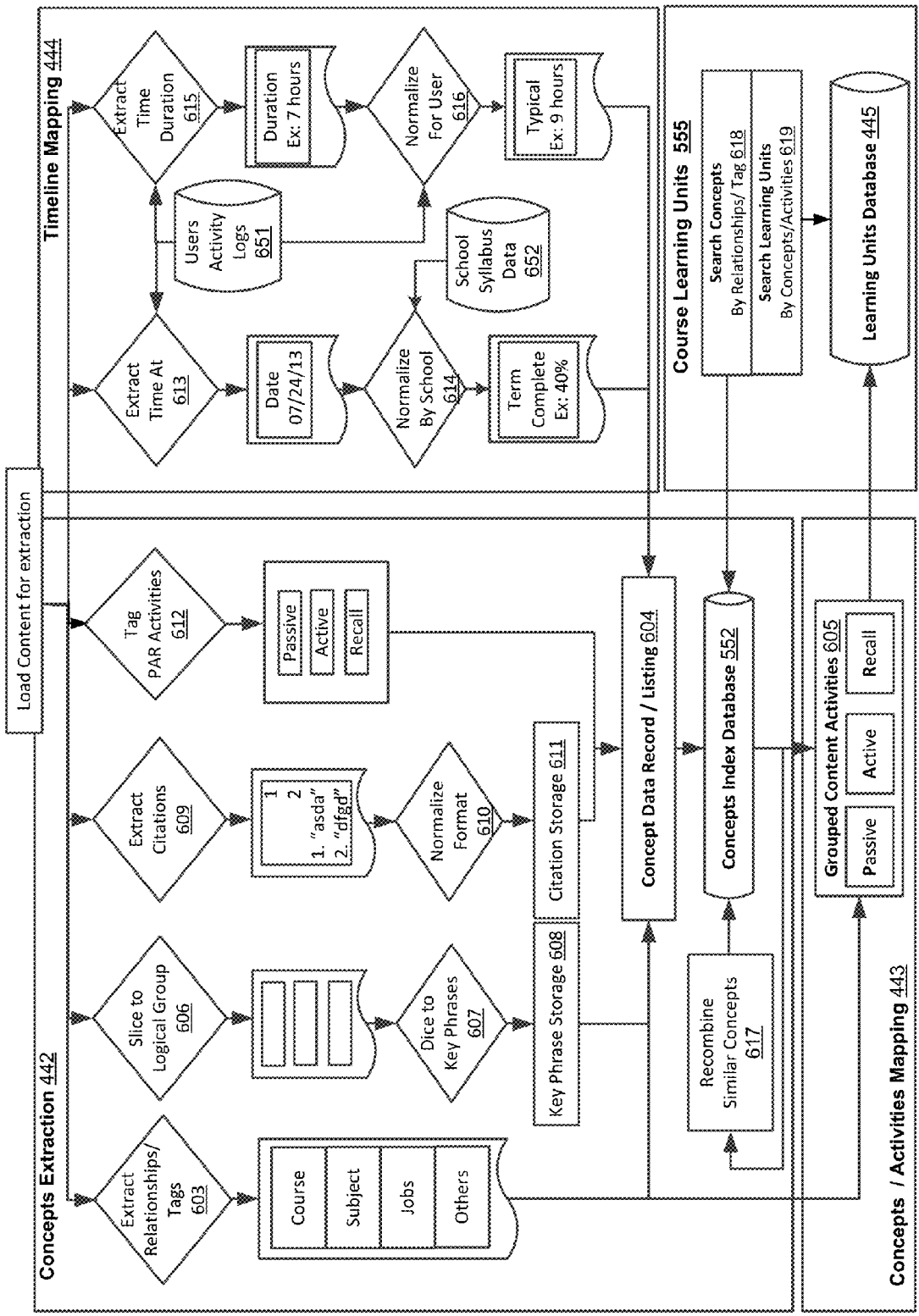

FIGS. 6A-B illustrate a process of learning unit extraction performed by automated learning units extraction systems, according to one embodiment. As illustrated in FIG. 6A, content analysis 441 begins with materials from the platform content catalog database 451 which have been associated with passive, active, and recall user activities. In step 601, content media types are identified. The media types may be inferred from data from the content catalog database 451 or the users' content activities, or the media types may be explicitly tagged. Certain media types, such as a summary of a course and a course syllabus, may tend to be more reliable and indicative of the learning units that will be studied in a course than other media types, such as related content and UGC, which may only be tangentially related to the learning units studied in the course. The identification of the media types in step 601 allows the media types to be sorted in step 602. The media types may be sorted for example, in descending order of reliability or importance in terms of containing valuable concepts for extraction as the basis of a learning unit. In one embodiment, the media types are ordered as follows: summary, syllabus, textbook, related content, UGC, Q&A, and testing materials, with all other materials following. The summary, syllabus, and textbook may be considered primary sources, whereas the remainder of the sources may be considered secondary sources. The content is loaded in the sorted order for extraction.

FIG. 6B continues FIG. 6A at the point that content has been loaded for extraction. The concepts extraction module 442 and the timeline mapping module 444 illustrate several processing steps that may be undertaken sequentially or in parallel for each media type.

In step 603, relationships and tags are extracted from the loaded content. In one embodiment, these relationships are the relationships between the content and the course, subject of study, jobs relevant to the field of study, and any other field that may be tracked by an education platform. The relationships may be explicitly tagged within the content catalog database 451. These explicit tags can be fed into the concept data record or listing 604. The tags may also be fed into the grouped content activities 605, which will be discussed in great detail below.

In step 606, the loaded content can be sliced into logical groups. The logical groups may be determined based at least in part on the structure of the loaded content, for example a subsection of a textbook, a chapter of a study guide, or a paragraph of a course summary. Then, in step 607, the logical groups are diced into key phrases 607 using language analysis. Generally, the key phrases are candidates for concepts, and are composed of a combination of an "operator" and an "operand". It can also be thought of as a verb and a direct object. It is this combination that uniquely identifies a particular concept. The "operator" is the action that a student learns to perform and the "operand" is the type of thing that the student learns to perform the action on. Either can be specific or broad. A major difference between the Humanities and Science is that the operands in the Humanities courses are very specific and the operators are very broad, while the opposite is true for Science courses. For example, "Perspectives of Free Black Soldiers in the American Civil War" is a dramatically specific "operand" but the "operator" for a class studying it is nearly the same as every other Humanities course, based on "compare," "contrast," "analyze" "look for trends and patterns," and "develop an opinion or argument for an underlying reason or structure." Even more specifically, classes can focus entirely around a single work, such as Thomas Pynchon's novel *Crying of Lot 49*. By contrast, a mathematics course focuses on a specific action "determining the linear independence of a system of equations," for example. However, it can then be applied to a wide range of different problems, and not just the specific instances of problems studied in class. In one embodiment, key phrases either have a specific operator or operand. Concepts where both are broad and generic are listed as undefined because they lack meaningful boundaries. Concepts where both are specific tend not to be as useful in some embodiments, although they are practical when learning to do repetitive tasks. As a result, the undefined key phrases which are identified may be listed separately and/or excluded from further processing. The key phrases that are identified from the loaded content are stored in step 608 as part of the concept data record 604.

In step 609, citations are extracted for character strings (e.g., character strings that have been identified as key phrases or may be text recitations of concepts). For example, for each loaded content item, the citations for a text string are indexed. In step 610, the text strings are normalized in format, for example by removing unwanted characters, eliminating punctuation, and standardizing language (e.g., making nouns singular or plural, and/or truncating verbs, or the like). The normalized citations are then stored in step 611 as part of the concept data record 604.

In step 612, the loaded content is tagged as stemming from passive, active, and recall activities undertaken by users. The tags are also passed to the concept data record 604.

In step 613, as part of the timeline mapping module 444, the loaded content is analyzed to extract the time which is relevant to the content, for example, when pages were read, when a quiz was completed, when an assignment was started, or the like, as informed by the users activity logs 651. In step 614, by referencing the school syllabus data 652, the process can normalize the extracted time relevant to the content according to the school in order to determine a relative time within the course at which the content was acted upon. For example, if a section of a textbook was read in the fourth week of a 10 week summer course, it could be normalized to being studied when 40% of the term was complete, and thus compared against the normalized timing of reading the section of a textbook 40% through a longer Fall semester, or against the timing of reading of the section of a textbook in previous summer terms. The normalized timing of activities is stored in the concepts data record 604. In one embodiment, the normalized timing of activities may be reported for use in updating the school syllabus data 652 to be responsive to adjustments in the flow of the course delivery. Depending on circumstances, a class may linger on a learning unit longer than planned at the outset of the course, for example, and the reported normalized timing of activities can be used to dynamically update the course syllabus according to the reality of the course delivery.

In step 614, also as part of the timeline mapping module 444, the loaded content is analyzed to extract the time duration of an activity, for example how long a user spent reading a chapter, working on a problem set, or the like, as informed by the users activity longs 651. For example, a student may have spent 7 hours studying a chapter of a textbook, as revealed by the elapsed time in each of a user's reading sessions for that chapter recorded in the users activity log 651. The user's individual time can be normalized across users in step 616 by referring to users activity logs 651 to determine a typical duration for the activity. The user's specific duration or the normalized duration may also be stored in the concepts data record 604. In one embodiment, the normalized duration of activities may be reported, for example, for use in planning future iterations of a course. By knowing on average how long students spend on each activity in a learning unit, an appropriate duration of the learning unit and an appropriate number of learning units for a course can be planned so that the course fits within the school schedule and engages students at an appropriate level of involvement.

As described above, several processes of the concepts extraction module 442 and the timeline mapping module 444 have populated the concept data record 604, which is indexed by the concepts index database 552. In step 617, similar concepts can be combined and collapsed into one concept in the concepts index database 552 to avoid duplication and simplify the database 552. Such a recombination process may be performed iteratively as new content is loaded for extraction and analyzed. It is noted that while some concepts may be uncommon in a particular course, such as covering the personally favored topics of a particular instructor, a great many are shared between courses that share the same logical curricular block. For example, every course on "beginning linear algebra" covers the topic "linear independence." Therefore, the extraction systems are effectively building up the list of concepts for courses over time even when the list is not complete for a given course.

The concepts index database 552 can be used together with the grouped content activities 605 to create a learning unit. The association between a concept from the concepts index database 552 and the passive, active, and recall activities 605 that a student undertakes to study the concept together make up the learning unit, which is stored in the learning units database 445. Accordingly, by using course learning units 555, an interested party can search concepts by relationships or tags in step 618 through the concepts index database 552, or an interested party can search learning units by concepts or activities in step 619 through the learning units database 445. The interested party may be a student seeking to fill gaps in their education, a teacher planning a course, an administrator organizing a curriculum, an employer designing job requirements or seeking job applicants, or any other person or system interested in how students engage in their education on a digital education platform.

Predictive Model

Figure 7:
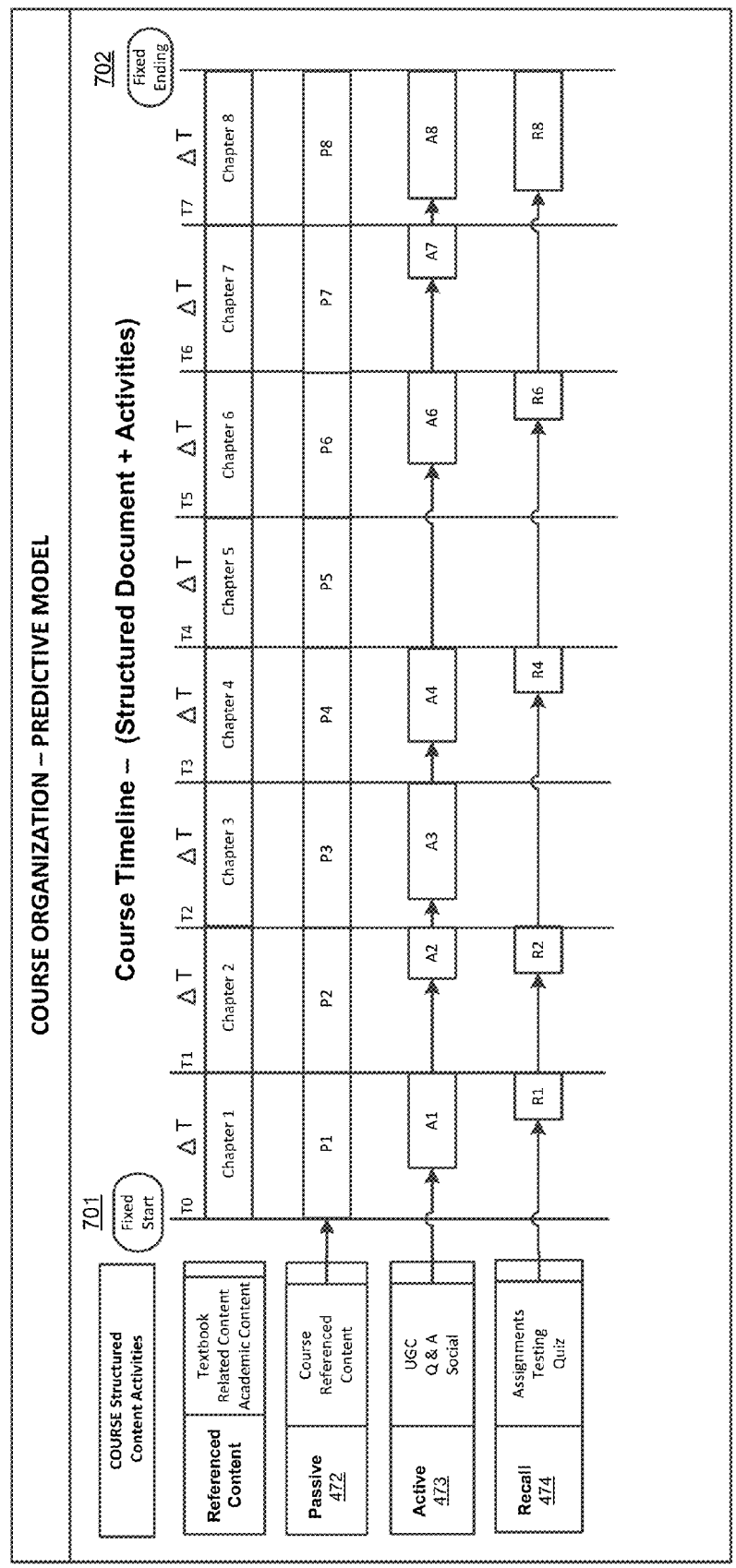
FIG. 7 illustrates a predictive model of course organization, according to one embodiment.

FIG. 7 illustrates a predictive model of course organization, according to one embodiment. In this example, the course structured content activities are completed between a fixed start 701 and a fixed ending 702 of the course timeline. The course timeline includes a subdivision that predicts what activities a user studying the course will undertake in each of several time periods throughout the actual delivery of the course. In this example, the course is divided into eight equal time periods, but the time periods may vary in length in other examples. Likewise, in this example, there are passive 472 activities expected in the schedule of each of the time periods, but active 473 and recall 474 activities scheduled in only some of the time periods, but that need not be the case in other examples. Typically, passive sessions will be interleaved with active sessions and followed by a recall session if available. When applied to general course delivery, registered students are reading one or more pages of the course referenced document, then are interacting with these pages by adding their own content layer and continuing to iterate on that basis until reaching and completing a testing event, thus allowing them to move to the next phase of the course delivery. The course is completed once all chapter-based activities are executed, sequentially or not, or when time runs out. In addition, as the same courses are delivered repeatedly over time, the platform 450 can build a model of likely activities for each course in its catalog. The outcome of this is a predictive learning model for a course and/or class. The time interval, delta T, along with passive 472, active 473, and recall 474 activities, are predicted based on analytics from previous courses and classes that have been delivered. The model is then applied across multiple instances of that course, enabling direct comparisons between similar courses and cross indexing likely content activities and events.

Structured Courses by Learning Units

Figure 8:
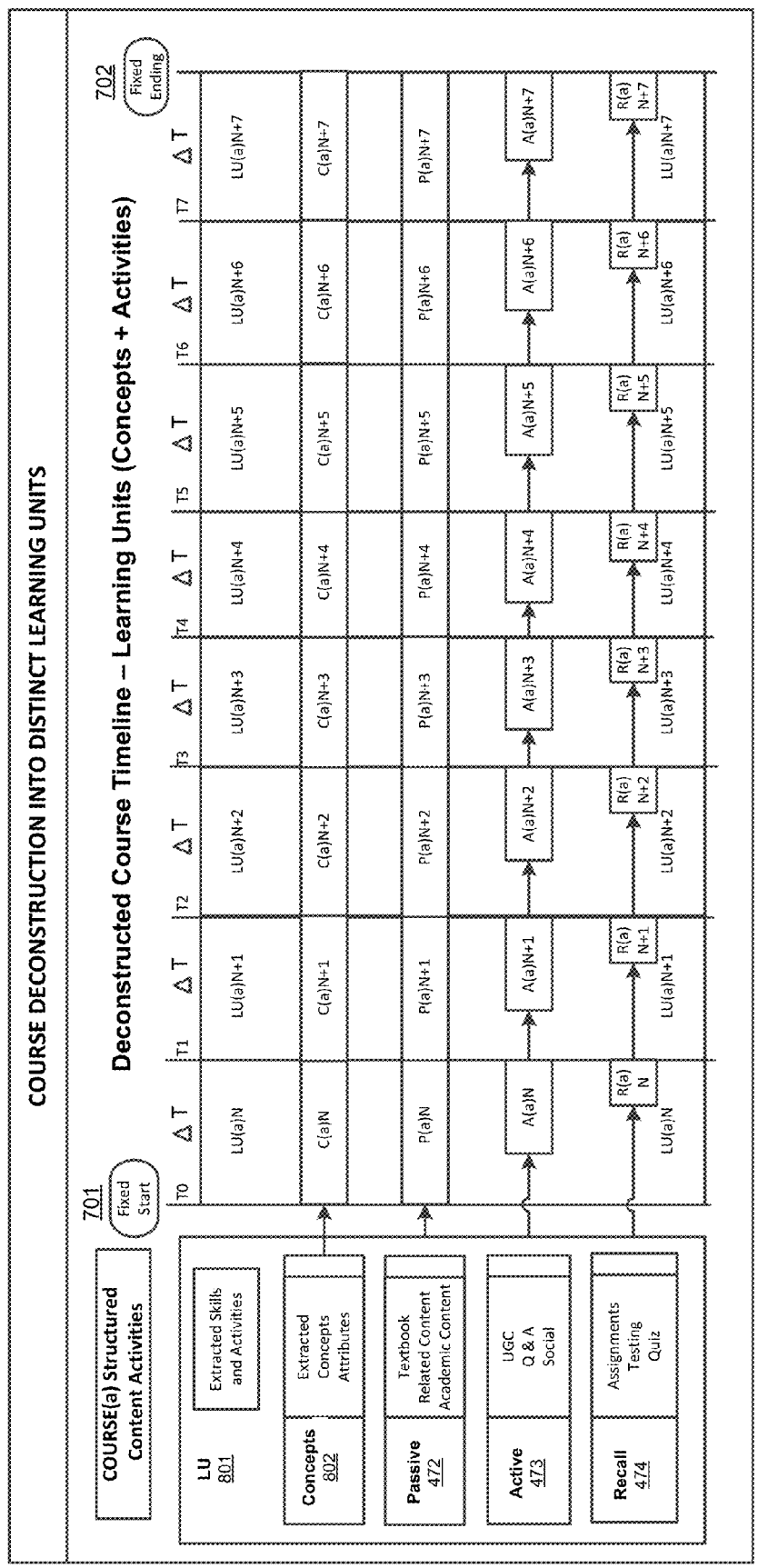
FIG. 8 illustrates an example course deconstruction into distinct learning units, according to one embodiment.

FIG. 8 illustrates an example course deconstruction into distinct learning units, according to one embodiment. As discussed previously, the structure and delivery of a course can be expressed as the aggregation of passive, active, and recall on-line sessions that collectively summarize all the events and content activities associated to that course by the registered users during its actual delivery. Once the learning units have been extracted, the course is effectively atomized into a series of concepts and relevant activities, determining a new structure and organization for that course. In this new learning model, the course referenced content, i.e., the textbook, which is traditionally determining the structure of the course, is replaced with individual learning units that are more accurate indicators and representations of what students need to achieve. In some embodiments of the invention, the modular nature of the learning units allows them to be rearranged, mixed with learning units from other courses, and aggregated in different orders in order adapt learning materials to suit different learning styles, instructor preferences, institutional goals, or for any other reason.

As shown in FIG. 8, the course is deconstructed into a timeline between a fixed start 701 and a fixed ending 702. In this scenario, the time allotted to each learning unit 801 is predicted based on analytics of user activities reported from previous courses/classes. Each learning unit 801 is associated with a concept 802 and is associated with at least one activity. In this example, each concept 802 is supported by a passive 472, an active 473, and a recall 474 activity, but that need not always be the case. In one embodiment, if holes exist, the extraction system 440 can fill in the activities for a given concept. Depending on the type of concept, the platform 450 suggests a wide range of products and services that can fulfill one of the activity types of the learning unit. For instance, the platform 450 can suggest additional reading for more passive learning, homework help and additional tutoring for active learning, and practice quizzes and tests for recall, all based on the indexed concepts and activities in the learning units database 445 that correspond to the learning units that a student is studying in a course. These can be useful to the user regardless of whether they are perfectly aligned to the particular assignments that are offered in the school because they are focused on mastering the same concepts. This way, the platform services can monitor users to ensure they are on track to succeeding and prodding them to seek more help if they are falling behind.

Correlating Jobs to Registered Users Based on Learning Units

The job correlation process generally includes identifying the courses and learning activities that registered users have performed during the education cycles and matching them against the captured requirements of available jobs. In this environment, the registered users are defined as students that have either completed or are currently registered to one or more courses through the education platform. By accessing the profile of the registered user, the platform can retrieve detailed information about the courses taken and the activities completed by that particular user. By having previously deconstructed these courses into individual learning units, a registered user who is seeking a job can be characterized by the summation of all the learning units completed by the user. Similarly, by processing each job posting and characterizing it as a set of specific learning units, the online education platform is able to make a direct correlation between these distinct sets of learning units.

When a correlation between a student's learning units and a job posting's learning units is successful, the recommendation system may rank and sort the listed jobs to the registered user, and/or rank and sort prospective job applicants for an employer or recruiter, by any relevant criteria to the job search or employee search. When a correlation is not successful, the recommendation system may then compute a list of near matches and compute the gap between each job and the student's set of learning units, and order the near matches based on the size of the gap. For example, a gap of a single learning unit between a student's learning units and a first job is ranked higher than a gap of two or more. The ranked jobs are then distributed to the planning system for organizing the respective learning activities into one or more scheduled cycles.

Figure 9:
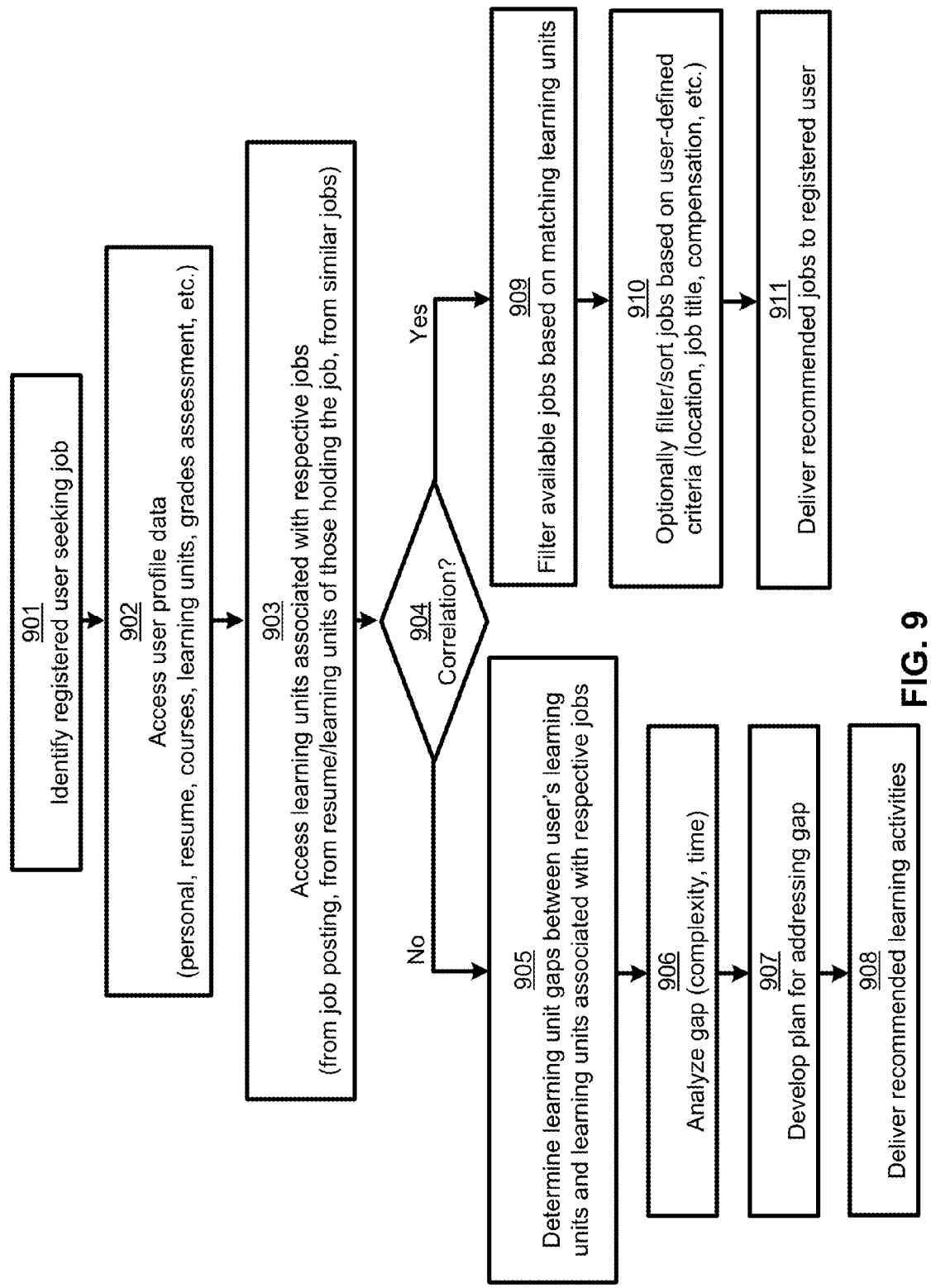
FIG. 9 illustrates an example method of recommending learning activities or jobs to registered users exploring the job market, according to one embodiment.

FIG. 9 illustrates an example method of recommending learning activities or jobs to registered users exploring the job market, according to one embodiment. In step 901, a registered user seeking a job is identified, for example by logging in or by accessing a job search section of the education platform. In step 902, the registered user's profile data are accessed. The profile data may include personal data such as name, address, social connections, etc., as well as resume data, courses taken, learning units earned, grades assessments, and other data tracked by the education platform. The profile data is a rich set of data that includes the user's interactions with the education platform, potentially over the course of several education cycles.

In step 903, the learning units associated with respective jobs are accessed, for example from job postings, from resumes or learning units of those holding the job themselves, and/or from similar jobs. The learning units associated with a job will be described in detail below with reference to FIG. 10.

In step 904, the education platform determines whether there is a correlation between a user's learning units and the learning units associated with respective jobs. In some implementations, a minimum number or percentage of the learning units associated with a job need to correspond to the user's learning units in order to conclude that a correlation exists. If there is no correlation, then in step 905 the learning unit gaps between the user's learning units and the learning units associated with respective jobs is determined. The gaps represent additional concepts that a student should learn before applying for the job in order to meet the qualifications of the job. The gaps may vary in size from a single learning unit to dozens or more learning units that a user would need for the job. In step 906, the gap is analyzed in terms of complexity of completing the outstanding learning units and the time involved. Other factors may also be considered, such as the difficulty, the expense, the location, and so forth. Once the gap is analyzed, in step 907 a plan for addressing the gap can be developed. A process for planning to address a gap will be described below with reference to FIG. 13. Then, in step 908, the recommended learning activities for a user to pursue one or more selected jobs are delivered for presentation to the user. This information can assist the user in planning the user's further academic activities to tailor them to desired career opportunities.

If in step 904, the education platform determines that there is a correlation between a user's learning units and the learning units associated with respective jobs, then in step 909, available jobs are filtered based on matching learning units. Thus, jobs with the highest correlation between the learning units associated with the job and the user's learning units are selected as being best matches for the user's knowledge, skills, and interests. In step 910, optionally, the jobs can be further filtered and/or sorted based on user-defined criteria such as location, job title, compensation, employer, and/or other relevant job search criteria. In some cases, a probability factor based on the user's profile information is computed and applied to each of the matching jobs. The probability factor is one mechanism for estimating the likelihood that the user will be a successful applicant for the job. For example, the probability factor may boost the estimated likelihood of success for applicants with high grade point averages, a strong match of learning units, solid work history, etc., and lower the estimated likelihood of success for applicants who are applying to highly competitive employers or applicants who meet fewer than all the learning unit requirements of the job, for example. The probability factor may be informed, in part, by other users that have applied successfully, or not, to the same type of job in the near past. By comparing the other applicants' grades, learning units, and/or other factors, to the user's profile data, the system can estimate the likelihood that the user will be a successful applicant for the job. In step 911, recommended jobs are delivered to the registered user, including, if available, the probability factor for estimating the likelihood that the user will be a successful applicant for the job if the user decides to pursue it.

Figure 10:
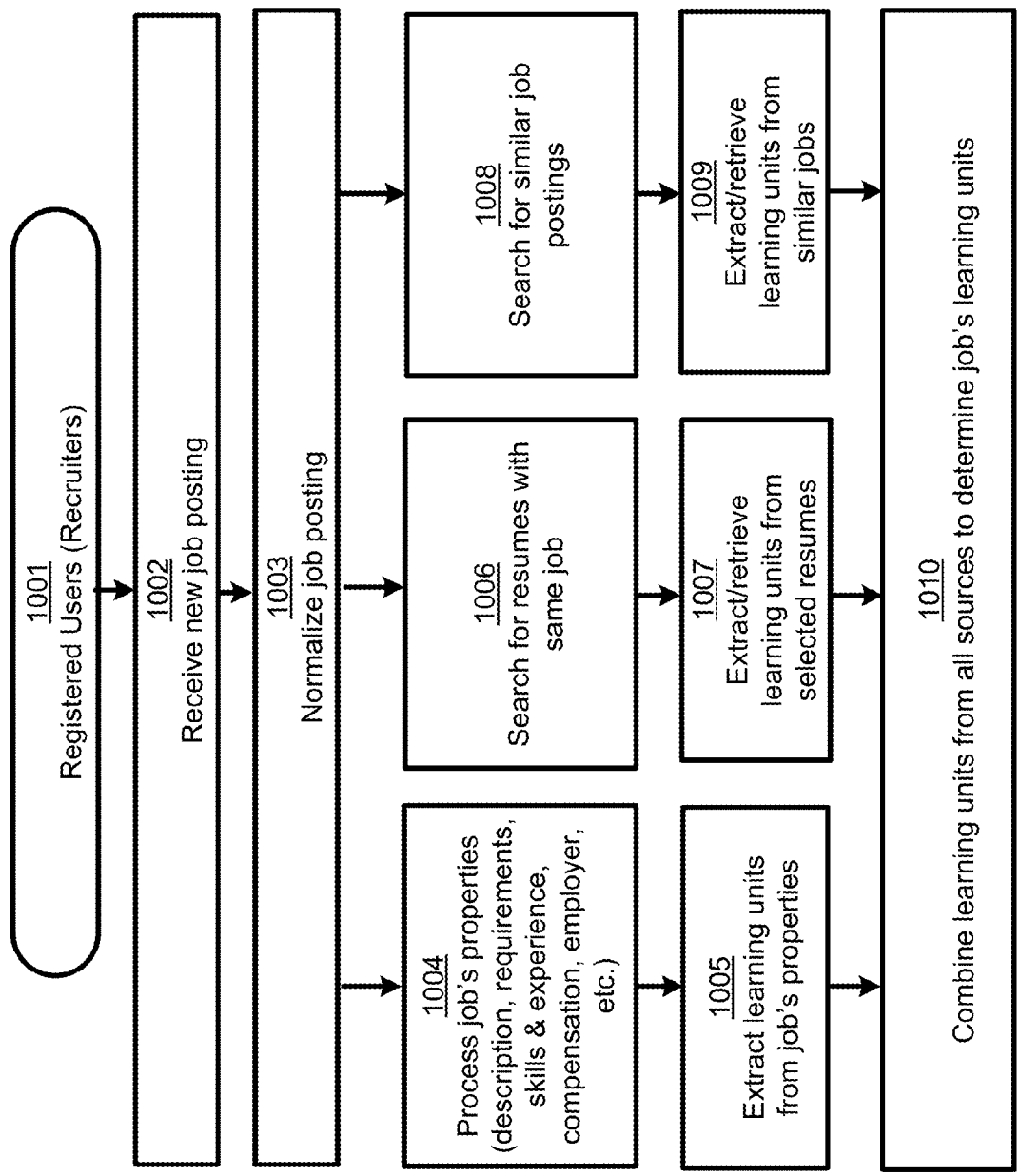
FIG. 10 illustrates an example method of determining the learning units associated with a job according to one embodiment.

FIG. 10 illustrates an example method of determining the learning units associated with a job according to one embodiment. In this example, the online education platform offers job posting services to recruiters 1001, who are a class of registered users of the platform. In this mode, recruiters typically upload new job listings to the platform for processing. Examples of new jobs listings are provided in FIGS. 11A-C.

Figure 11C:
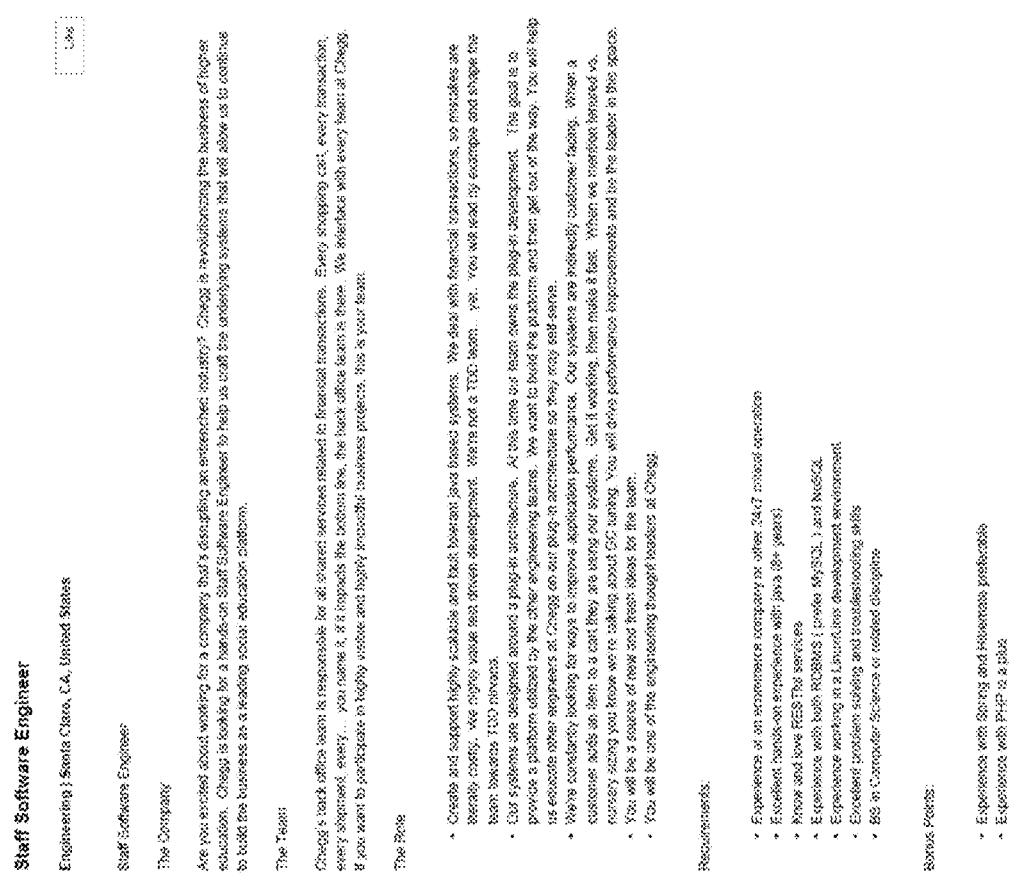

In step 1002, the platform receives a new job posting. As illustrated in the examples of FIGS. 11A-C, the job posting may be for any industry, and may recite any combination of requirements and desirable qualifications for the position.

In step 1003, the new job posting is normalized. The normalization process involves pre-processing the job posting to transform it into a format that can be interpreted by the platform. The normalization process may strip any unnecessary formatting, identify keywords and concepts, and the like. The normalization process may include determining the industry and the job type. The normalization process may attempt to normalize the language used by the job poster to describe the requirements versus other desired qualifications. For example, the job posting illustrated in FIG. 11A lists "Desired skills and experience" whereas the job posting illustrated in FIG. 11B refers to "Nice to Haves" and the job posting illustrated in FIG. 11C refers to "Bonus Points." Moreover, the job posting illustrated in FIG. 11B refers to "Must Haves" and the job posting illustrated in FIG. 11C refers to "Requirements." The normalization process may translate these and other variations into a set of common terms (such as "Requirements" and "Other Desirable Skills/Experience") and optionally, ask the job poster to confirm the translation is appropriate, or if not, edit it. Thus, in one embodiment, the job posting content is used to populate fields in a template that can be interpreted by the platform.

After normalization, the platform may concurrently or sequentially perform steps 1004-1009. In step 1004, the job's properties are processed, including, for example, the description of the job, the requirements for the job, the skills and experience needed, the compensation level, the employer identification, the date of the posting, and any other properties that may be included in the job posting. In step 1005, learning units are extracted from the education-specific properties of the job. For example, if a job requires applicants to have a particular degree, the degree is translated into a set of courses that make up the degree, and accordingly, the learning units that make up those courses. If a job requires applicants to have had coursework in a particular subject, this can be translated into learning units as well. In addition, the required skills and experience are processed to determine the set of keywords that further characterize that job. For instance, the required skills specific for that job include certain knowledge and background information which are distinct from the required academic degrees and courses. For example, a job posting for software engineering typically include software specific keywords, such as "HTML," "Java," or other references which are indexed and compared within the online education platform with corresponding courses and associated learning units. As the online education platform is the repository of an always expanding content library, the keywords that are referencing specific skills are correlated within the library to provide increasingly accurate matching to appropriate learning units for those specific skills.

In step 1006, a database of resumes that are stored by the platform, having been previously submitted by other registered users for a variety of jobs, can be searched to find resumes of people who have the same or similar job as the new job posting. In step 1007, learning units can be extracted or retrieved from the selected resumes or from the profiles of the users who submitted the resumes. One of the advantages of the online education platform is that the registered users' educational activities are tracked through the users' interactions with the platform. Thus, the platform can record what learning units each user has completed. This can be used to supplement what the recruiter submitted about the job to provide a clearer, more complete picture of what concepts and skills are relevant to this type of job, in case some were omitted by the recruiter in the job posting. Further details regarding extracting/retrieving learning units from resumes are discussed below with reference to FIG. 12.

In step 1008, a database of job postings is searched for similar job postings. In step 1009, learning units can be extracted or retrieved from similar job postings. Similarity may be defined as other job postings for the same employer, other job postings for jobs with similar titles, other job postings that are associated with a common set of learning units, other job postings in the same field of endeavor. As each of these job postings has been previously processed, they are each already associated with a set of learning units which can be retrieved in step 1009. The sets of learning units of the similar jobs may be used to supplement the learning units associated with the job as identified in steps 1005 and 1007.

In step 1010, the learning units identified as associated with the job from steps 1004-1009 are combined to determine the job's learning units. In one embodiment, the job's learning units may be divided into a group of required learning units and a group of recommended learning units. This list may or may not be presented to the recruiter for confirmation, depending on the implementation. A recruiter viewing the list may be motivated to add or subtract various learning units, adjust whether learning units are required or recommended, etc., to create the final list. The final list will be used for comparison purposes to identify strong candidates for the position and those candidates who may wish to strengthen their candidacy by undertaking further learning activities.

Figure 12:
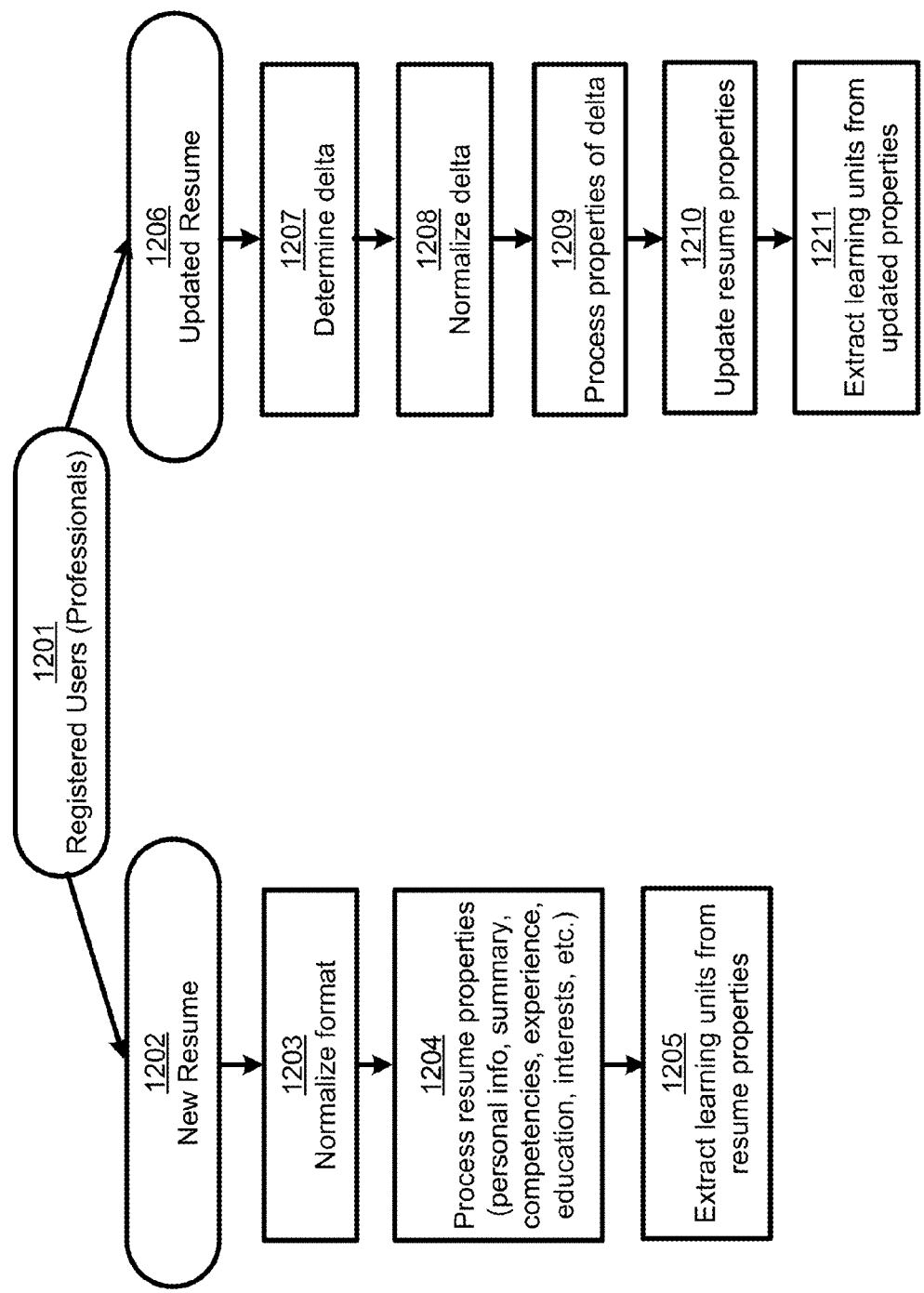
FIG. 12 illustrates an example method of extracting learning units from resumes according to one embodiment.

FIG. 12 illustrates an example method of extracting learning units from resumes according to one embodiment. In this mode, another class of registered users of the online education platform are professionals 1201. Professionals are seeking jobs by uploading their resume for processing and searching for jobs that match their skills and experiences. In this context, a professional is defined either as a student seeking a first job or a former student that has, or had, a job and who is looking for a new one. Professionals upload new resumes 1202 or updated resumes 1206 which are processed by the platform the extract both the academic course-based learning units as well as the professional job-based learning units.

In step 1203, the new resume's format is normalized. The normalization process involves pre-processing the resume to transform it into a format that can be interpreted by the platform. The normalization process may strip any unnecessary formatting, identify keywords and concepts, and the like.

In step 1204, the resume properties are processed. The resume properties may include personal information (such as contact information, purpose of the resume, etc.), summary, competencies, experience, education, interests, and other properties.

In step 1205, learning units are extracted from the resume properties. The academic learning units are directed processed from the resume's properties by first identifying the one or more academic degrees obtained by the professional. Following identification, the platform matches the degrees to the set of required courses and corresponding learning units from the online education platform database. For instance, a Bachelors of Science from a specific university is defined as the aggregation of multiple courses that the online education platform already processed and deconstructed into learning units. The professional learning units are directly processed from the non-academic properties that are specific to a resume, including its summary, self-described list of competencies, description of jobs and activities performed, personal interests and other data that collectively characterize the professional nature of a resume. For instance, professional properties typically include job title, employer name, starting and end date (if applicable) as well as a description of the responsibilities performed over time. The keywords that describe these responsibilities, once sorted and combined by the platform, collectively define the set of professional learning units that are applied to the profile of the owner of the resume and that are updated each time that user takes another job.

When updating an existing resume, a professional typically modifies or adds data to the resume properties. In step 1207, a delta or change is determined between a previous version of the resume and the new version. In step 1208 the delta is normalized, similar to the normalization process described with respect to step 1203. In step 1209, the properties of the delta are processed. The academic learning units are somewhat static over time while the professional learning units expand based on job's responsibilities. Thus, it is expected that the delta for many professionals will be composed mainly of professional learning units. In step 1210, the resume's properties are updated according to the delta. Then, in step 1211, learning units can be extracted from the updated properties. Thus, students and the system as a whole benefits from on-going feedback from professionals who indirectly provide increasingly accurate recommended learning units based on their experiences in the working world as reflected in their updated resumes.

Figure 13:
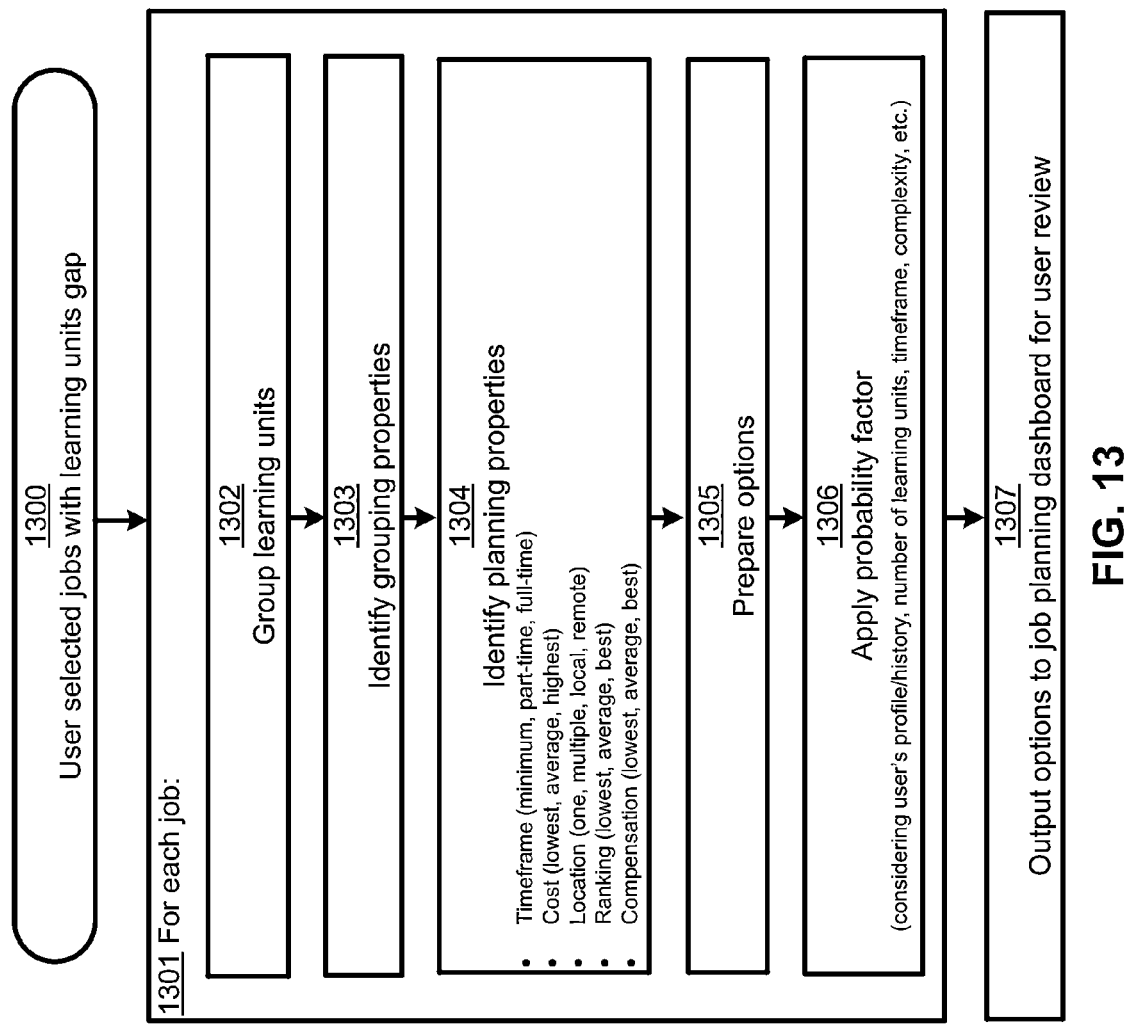
FIG. 13 illustrates an example method of planning learning activities for registered users in relation to selected jobs according to one embodiment.

FIG. 13 illustrates an example method of planning learning activities for registered users in relation to selected jobs according to one embodiment. A registered user who selected jobs that require additional learning activities can receive assistance from the platform in planning how to address the learning units gap. Because the learning activities may be numerous, it may be important to provide a tool for the mapping and representation of these activities to the user. The method begins at 1300 with one or more jobs selected by a user where a learning units gap has been identified between the user's learning units and the learning units of the job. In step 1301, for each job, steps 1302-1306 are performed. In step 1302, the learning units that make up the learning unit gap are grouped into one or more logical groups. Each logical group represents a subset of learning units, for example, all of the learning units associated with a particular beginning level course.

In step 1303, the grouping properties are identified. The grouping properties specify the sequence requirements between groups. For example, a group of learning units that are associated to a specific beginner course in a particular domain have to be planned before a group of learning units that are associated to an intermediate course for that same topic, and so on. The grouping properties specify that the learning units group associated with Biology 101 must be ordered sequentially and mapped before the Biology 102 learning units group. In this model, groups that are not mapped linearly with another group can instead be mapped in parallel. For instance, a learning units group associated with the Physics 101 course can be mapped in parallel to a learning units groups associated with either Biology 101 or Biology 102, but is mapped linearly to a learning units group associated with Physics 102, and so on.

In step 1304, the planning properties are identified. Planning properties typically include timeframe, cost, location, ranking, and compensation, when available. The timeframe property is defined as the aggregated minimum timeframe which is required for each grouping of learning units to be learned as computed by the online education platform. The cost property is defined as the aggregated cost for each grouping of learning units as computed by the online education platform. Cost is defined here as cost of registration for the delivery of the grouping based on data available to the online education platform. The location property is defined as the location delivery for the learning of each grouping of learning units. For instance, location can refer to one physical place, such as a school, multiple locations, such as multiple schools, online learning, or a combination of physical locations and online learning. The ranking property is defined as the ranking of similar groupings of learning units as computed by the online education platform. Specifically, groupings of learning units may be served from different sources (e.g., schools, institutions, etc.), and therefore may be ranked differently based on reputation for quality education. The compensation property may be based on the original job listing and is a factor in establishing the value of a job against the learning activities that need to be completed before applying to it, effectively calculating the return on investment for the jobs selected from the online education platform.

Optionally, the platform may process the planning properties of groupings of learning units based at least in part on a set of preferences entered by the user for planning to meet the learning units gap. These preferences may relate to timeframe, cost, location, ranking, and compensation. Examples of these preferences are provided below:

Timeframe
    Minimum: indicates that the registered user has limited time available for new learning activities. When set, the system prefers options that require the least amount of hours per week.
    Part-time: indicates that the registered user has set aside up to 50% of his/her time for new learning activities. When set, the system prefers options that require up to 20 hours per week.
    Full-time: indicates that the registered user has set aside up to 100% of his/her time for new learning activities. When set, the system prefers options based on the equivalent of up to 40 hours per week.

Cost
    Lowest: indicates that the registered user has limited or no funding available for new learning activities. When set, the system prefers options that are cheapest or available for free, such as MOOC, where available.
    Average: indicates that the registered user has average funding available for new learning activities. When set, the system does not consider any special cost constraints.
    Highest: indicates that the registered user does not have funding constraints. When set, the system prefers options that are higher priced as an indicator of higher quality.

Location
    One (physical): indicates that the registered user has a preference for a single physical location for the new learning activities.
    Online: indicates that the registered user has a preference for online services for the new learning activities.
    Combination (physical+online): indicates that the registered user prefers a combination of both physical and online services where available.

Ranking
    Average: indicates that the registered user has no specific preference for the ranking of the new learning activities.
    Highest: indicates that the registered user has a preference for the highest ranking learning activities. When set, the system prefers the highest available ranking of the learning units.

Compensation
    Average: indicates that the registered user has no specific preference for compensation.
    Highest: indicates that the registered user has a preference for the jobs with highest compensation.

In step 1305 options are prepared for how to fill the learning unit gaps. In one embodiment, the options are prepared with reference to the above preferences of the user.

In step 1306, a probability factor is applied to the options. The probability factor may consider the user's profile/history, the number of learning units involved in the plan, the number of linear groupings, the number of parallelized groupings, the cost, the timeframe, the complexity, and any other factor based on information obtained by the platform that would influence how likely the registered user is to succeed with the plan. In one implementation, the probability factor is based on the grade assessment from the user profile as a proxy measure of the user's stamina and academic record. A job that would require a single learning unit would be given a very high probability compared to a job requiring multiple learning units.

Once steps 1302-1306 are completed for each job, in step 1307, the options are output to a job planning dashboard for the user's review. Examples of job planning dashboards are provided in FIGS. 14A-B. The job planning dashboard represents the visualization of the plan to address the user's learning units gap in order to have the background to apply for one or more user-selected jobs. The job planning dashboard is provided as a tool that the registered user can interact with and consult when registering for additional coursework or other learning units. As illustrated in the example of FIG. 14A, the jobs may be listed in descending order by the probability factor. The user may further filter the results by any of the criteria such as timeframe, cost, complexity, or compensation. In one implementation, the user can drill down on one option by selecting it from the job planning dashboard to see a detailed proposed schedule of which learning units to tackle in which order in order to strengthen the user's candidacy for a particular job for which the user is currently under-qualified. FIG. 14B illustrates an example job planning dashboard in which the user has selected only two criteria on which to evaluate potential future jobs: timeframe and expected compensation. In this example, the timeframe represents the amount of time needed to acquire the missing learning units, and the expected compensation estimates the compensation level of the job. Using this tool, the user can visualize the tradeoff between, for example, the extra effort required to complete the missing learning units for Job Z versus Job X compared to the expected extra compensation for Job Z versus Job X.

In sum, the online education platform can match job postings to actual learning activities performed by registered users. The system goes beyond pointing out deficiencies to developing a tailored plan for addressing any gaps. By bridging the academic and business worlds, the online education platform is poised to provide valuable feedback to students and professionals who are looking to advance their knowledge, skills, and careers.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for providing recommended learning activities, the method comprising:
   receiving electronic documents for each course of a plurality of courses;
   performing text extraction on the electronic documents to extract sequences of glyphs;
   mapping the extracted sequences of glyphs into character strings;
   performing text coalescing on the character strings to generate markup language documents;
   extracting and normalizing, from the generated markup language documents corresponding to the plurality of courses, combinations of operands and operators that characterize concepts within the plurality of courses;
   indexing each combination of operands and operators with a concept in an online concepts index database;
   mapping, by an activities mapping module, each concept to one or more passive, active, and recall activities performed by users responsive to studying the concept, to generate learning units, each learning unit comprising the concept and the activities to which the concept was mapped;
   accessing user profile data, the user profile data including the users' learning units;
   accessing learning units associated with respective jobs;
   determining a learning unit gap between a user's learning units and the learning units associated with the respective jobs;
   developing a plan for addressing the gap, the plan including one or more recommended learning activities; and
   delivering a portion of the generated markup language documents corresponding to the recommended learning activities to the user through an online education platform.

2. The method of claim 1, wherein at least some of the user's learning units were recorded through interactions with the online education platform.

3. The method of claim 1, wherein the accessing learning units associated with the respective jobs comprises, for at least one job, extracting learning units from properties of the at least one job from a posting of the at least one job.

4. The method of claim 1, wherein accessing learning units associated with respective jobs comprises, for at least one job, extracting learning units from resumes of others with the same job.

5. The method of claim 1, wherein accessing learning units associated with respective jobs comprises, for at least one job, extracting learning units from similar job postings.

6. The method of claim 1, wherein developing a plan for addressing the gap comprises:
   preparing options;
   applying a pre-determined probability factor to each option, the probability factor determined based on one or more of a profile history of the user, a number of learning units involved in the plan, a number of linear groupings, a number of parallelized groupings, a cost value, a timeframe, and a complexity value; and
   outputting the options to a job planning dashboard for user review.

7. The method of claim 1, further comprising:
   fetching, by the online education platform, the markup language documents corresponding to the plurality of courses and analyzing the passive activities, wherein the passive activities correspond to passive interactions performed by the users around online authenticated sessions.

8. The method of claim 1, further comprising:
   managing, by the online education platform, a user-generated content layer created by the active activities.

9. The method of claim 1, further comprising:
   aggregating, by the online education platform, predetermined content corresponding to the recall activities, wherein the recall activities correspond to interactions performed by the users to test the users against knowledge acquired from passive and active sessions.

10. The method of claim 1, wherein the delivering of the recommended learning activities to the user is performed using edge servers of a content delivery network.

11. A method for matching users to job postings based on learning units, the method comprising:
receiving electronic documents for each course of a plurality of courses;
performing text extraction on the electronic documents to extract sequences of glyphs;
mapping the extracted sequences of glyphs into character strings;
performing text coalescing on the character strings to generate markup language documents;
extracting and normalizing, from the generated markup language documents corresponding to the plurality of courses, combinations of operands and operators that characterize concepts within the plurality of courses;
indexing each combination of operands and operators with a concept in an online concepts index database;
mapping, by an activities mapping module, each concept to one or more passive, active, and recall activities performed by users responsive to studying the concept, to generate learning units, each learning unit comprising the concept and the activities to which the concept was mapped;
accessing user profile data, the user profile data including the users' learning units, each learning unit comprising a distinct concept and passive, active, or recall activities associated with the distinct concept;
accessing learning units associated with respective jobs, each respective job described in a respective job posting;
determining a correlation exists between the user's learning units and the learning units associated with at least one respective job; and
recommending the at least one respective job to the user.

12. The method of claim 11, wherein at least some of the user's learning units were recorded through interactions with an online education platform.

13. A non-transitory computer-readable storage medium storing executable computer program instructions, the computer program instructions comprising instructions for:
receiving electronic documents for each course of a plurality of courses;
performing text extraction on the electronic documents to extract sequences of glyphs and embedded fonts;
mapping the extracted sequences of glyphs and embedded fonts into character strings in a Unicode format and positions for characters in the character strings, each position comprising a horizontal location and a vertical location for the character;
performing text coalescing on the character strings and the positions for the characters to generate markup language documents for the plurality of courses;
extracting and normalizing, from the generated markup language documents corresponding to the plurality of courses, combinations of operands and operators that characterize concepts within the plurality of courses;
indexing each combination of operands and operators with a concept in an online concepts index database;
mapping, by an activities mapping module, each concept to one or more passive, active, and recall activities performed by users on the generated markup language documents responsive to studying the concept, to generate learning units, each learning unit comprising the concept and the activities to which the concept was mapped;
accessing user profile data, the user profile data including the users' learning units;
accessing learning units associated with respective jobs;
determining a learning unit gap between a user's learning units and the learning units associated with respective jobs, the determining comprising:
determining a correlation between the user's learning units and the learning units associated with respective jobs, and
responsive to the correlation being below a threshold, identifying one or more gap learning units based on a difference between the user's learning units and the learning units associated with respective jobs;
developing a plan for addressing the gap, the plan including one or more recommended learning activities, the developing comprising:
grouping the gap learning units into one or more logical groups, and
identifying grouping properties representing a sequential ordering between the logical groups; and
delivering a portion of the generated markup language documents corresponding to the recommended learning activities to the user through an online education platform.

14. The medium of claim 13, wherein at least some of the user's learning units were recorded through interactions with the online education platform.

15. The medium of claim 13, wherein the accessing learning units associated with the respective jobs comprises, for at least one job, extracting learning units from properties of the at least one job from a posting of the at least one job.

16. The medium of claim 13, wherein the accessing learning units associated with respective jobs comprises, for at least one job, extracting learning units from resumes of others with the same job.

17. The medium of claim 13, wherein the accessing learning units associated with respective jobs comprises, for at least one job, extracting learning units from similar job postings.

18. The medium of claim 13, wherein developing a plan for addressing the gap comprises:
preparing options;
applying a pre-determined probability factor to each option, the probability factor determined based on one or more of a profile history of the user, a number of learning units involved in the plan, a number of linear groupings, a number of parallelized groupings, a cost value, a timeframe, and a complexity value; and
outputting the options to a job planning dashboard for user review.

19. A non-transitory computer-readable storage medium storing executable computer program instructions for matching users to job postings based on learning units, the computer program instructions comprising instructions for:
receiving electronic documents for each course of a plurality of courses;
performing text extraction on the electronic documents to extract sequences of glyphs;
mapping the extracted sequences of glyphs into character strings;
performing text coalescing on the character strings to generate markup language documents;
extracting and normalizing, from the generated markup language documents corresponding to the plurality of courses, combinations of operands and operators that characterize concepts within the plurality of courses;

indexing each combination of operands and operators with a concept in an online concepts index database;

mapping, by an activities mapping module, each concept to one or more passive, active, and recall activities performed by users responsive to studying the concept, to generate learning units, each learning unit comprising the concept and the activities to which the concept was mapped;

accessing user profile data, the user profile data including the users' learning units, each learning unit comprising a distinct concept and passive, active, or recall activities associated with the distinct concept;

accessing learning units associated with respective jobs, each respective job described in a respective job posting;

determining a correlation exists between the user's learning units and the learning units associated with at least one respective job; and recommending the at least one respective job to the user.

20. The medium of claim 19, wherein at least some of the user's learning units were recorded through interactions with an online education platform.

* * * * *